US008422056B2

(12) United States Patent
Ueda et al.

(10) Patent No.: US 8,422,056 B2

(45) Date of Patent: Apr. 16, 2013

(54) ELECTRIC APPARATUS

(75) Inventors: Nobuyuki Ueda, Nara (JP); Kaoru Ishikura, Kyoto (JP); Takashi Nakagawa, Nara (JP); Shuhji Fujii, Kizugawa (JP); Kazuhiko Ido, Kyoto (JP); Shinji Kato, Osaka (JP)

(73) Assignee: Sharp Kabushiki Kaisha, Osaka (JP)

( * ) Notice: Subject to any disclaimer, the term of this patent is extended or adjusted under 35 U.S.C. 154(b) by 1037 days.

(21) Appl. No.: 12/404,371

(22) Filed: Mar. 16, 2009

(65) Prior Publication Data

US 2009/0237723 A1 Sep. 24, 2009

(30) Foreign Application Priority Data

Mar. 18, 2008 (JP) ................................ 2008-069996

(51) Int. Cl.
*G06F 15/00* (2006.01)

(52) U.S. Cl.
USPC ............................ 358/1.15; 358/1.1; 358/1.9

(58) Field of Classification Search ................ 358/1.15, 358/1.1, 1.9; 345/127, 130
See application file for complete search history.

(56) References Cited

U.S. PATENT DOCUMENTS 5,771,469 A * 6/1998 Toba ............................ 455/566
2009/0201527 A1* 8/2009 Yamada et al. .............. 358/1.15

FOREIGN PATENT DOCUMENTS

| | | |
|---|---|---|
| JP | 2003-094764 | 4/2003 |
| JP | 2003-308195 | 10/2003 |
| JP | 2006-227171 | 8/2006 |
| JP | 2006-231675 | 9/2006 |
| JP | 2007-312318 | 11/2007 |
| WO | 2006/087960 | 8/2006 |

* cited by examiner

*Primary Examiner* — King Poon
*Assistant Examiner* — Iriana Cruz
(74) *Attorney, Agent, or Firm* — Renner, Otto, Boisselle & Sklar, LLP

(57) ABSTRACT

When an accepting unit is removed from a main unit, a situation of the main unit is detected whether belonging to waiting situations, operation situations, malfunction situations, or the like. A display part then displays images in accordance with the detected situations. The display part is arranged on the accepting unit that is removable from the main unit. Therefore, it is possible to change images displayed on the display part in accordance with the situations of the main unit at the time when the accepting unit is removed.

12 Claims, 17 Drawing Sheets

ELECTRIC APPARATUS

This Nonprovisional application claims priority under 35 U.S.C. §119(a) on Patent Application No. 2008-069996 filed in Japan on Mar. 18, 2008, the entire contents of which are hereby incorporated by reference.

BACKGROUND OF THE INVENTION

1. Field of the Invention

The present invention relates generally to an electric apparatus and, in particular, to an electric apparatus that comprises an accepting unit having a display part and accepting an instruction, and a main unit for performing an operation in accordance with the instruction, and displays a situation of the main unit on the display part.

2. Description of Related Art

Recently, it is well known for an electric apparatus such as copy machine, facsimile machine, printer, multi-function machine, or the like, to be provided a display unit and a control panel on the upper surface at the front side; the display unit can display information for, e.g. a situation of the apparatus, operation situation, malfunction, procedure to solve the malfunction, or the like; and the control panel has keys to operate the electric apparatus.

However, it has a problem that a user should be around the electric apparatus to see the displayed information on the display unit or to operate the electric apparatus through the control panel, because the display unit and the control panel are arranged on the upper surface of the electric apparatus and at the front side of the electric apparatus. Thus, it is hard for e.g. a user in a wheelchair, a repair man, a maintenance man or the like, to see the display unit and handle the control panel.

Japanese Patent Application Laid-Open No. 2003-94764 discloses an image forming apparatus including a main unit and a control panel. In view of such a problem, the control panel of the image forming apparatus is configured to have a display part and to be removable from the main unit. When the control panel is removed from the main unit, the display part shows only some information of what the display part has shown before the control panel is removed. In addition, when the control panel is removed from the main unit, the control panel accepts a handwriting input to operate the image forming apparatus. Those configurations are suggested to provide an image forming apparatus for a user in a wheelchair, a user whose sight line is lower than the control panel, an aged user with reduced power of vision.

In addition, Japanese Patent Application Laid-Open No. 2006-231675 discloses an image forming device including a main unit, a control unit, and a receiving unit. The control unit of the image forming device is configured to have a display part and a wire with a predetermined length. While the wire is connected to the main unit, the control unit is removable from the main unit. The receiving unit is fixed to the main unit, and receives position information of the control unit. Those configurations are suggested to provide an image forming device to guide a user, when the image forming device malfunctions, into an occurred site of the malfunction for solving the malfunctions while checking display on the control unit.

SUMMARY OF THE INVENTION

Disadvantages of the apparatus in Japanese Patent Application Laid-Open No. 2003-94764 and the device in Japanese Patent Application Laid-Open No. 2006-231675 lie in the fact that information shown by the display parts do not properly reflect situations at the time when the control panel or the control unit are removed. Concretely, the display part of the apparatus in Japanese Patent Application Laid-Open No. 2003-94764 shows a screen to accept the handwriting input to operate the image forming apparatus, even when the control panel is removed because the apparatus malfunctions, e.g. with operation stop. In addition, the display part of the device in Japanese Patent Application Laid-Open No. 2006-231675 shows a screen to guide a user into an occurred site of the malfunction or a screen to solve the malfunction after the control unit is removed, regardless of the situation at the time when the control unit is removed. Therefore, these attempts have ironically met problems to increase unavailability for users.

In addition, the control panel of the apparatus in Japanese Patent Application Laid-Open No. 2003-94764, as well as the control unit of the device in Japanese Patent Application Laid-Open No. 2006-231675, may be arranged at higher position than the sight line of a user e.g. in a wheelchair, i.e. be arranged beyond a range that the user in a wheelchair can see displayed information, although being arranged within a range that the user in a wheelchair can touch. It is considerable about the case that the user in a wheelchair tries to remove the control panel, as well as the control unit, from the main unit to see operation situation or to give a new operation to the apparatus or the device. Even at the case, the display part of the apparatus in Japanese Patent Application Laid-Open No. 2003-94764, as well as the control unit of the device in Japanese Patent Application Laid-Open No. 2006-231675, shows a screen regardless of the situation that the user in a wheelchair has removed the control panel or the control unit. In other words, the showed screens are the same regardless of the situation. Therefore, the result does not reflect the intent of the user, properly.

The present invention was made in view of such circumstances, and has a primary object to provide an electric apparatus which includes: a removable accepting unit having a display part and accepting an instruction; a remove detecting means for detecting whether the accepting unit is removed from a main unit or not; a situation detecting means for detecting whether the main unit is waiting for an instruction to perform an operation, is performing the operation, or malfunctions, at the time when the accepting unit is removed; and a display unit displaying an image in accordance with a detected result of the situation detecting means; e.g. allows the display unit to display a procedure information to solve a malfunction when the accepting unit is removed at the time of the malfunction, and allows the display unit to display an operation situation corresponding to the accepted instruction when the accepting unit is removed from a main unit at the time of performing the operation, to increase availability for users.

In addition, another object of the present invention is to provide an electric apparatus that increases availability for an aged user, a user with reduced power of vision, or the like, by displaying information with e.g. larger characters when the accepting unit is removed from the main unit.

An electric apparatus according to an aspect of the present invention comprises: an accepting unit having a display part and accepting an instruction; a main unit that performs an operation in accordance with the instruction, wherein the accepting unit is removable from the main unit; a remove detecting unit that detects whether the accepting unit is removed from the main unit or not; a situation detecting unit that detects a situation of the main unit when the accepting unit is removed from the main unit; and a display controlling unit that controls the display part to display information in accordance with a detected result by the situation detecting unit.

In the electric apparatus according to the aspect of the present invention, the situation detecting unit detects whether the main unit is waiting for an instruction to perform an operation, is performing the operation, or is malfunctioning, at the time when the accepting unit is removed, if the remove detecting unit detects that the accepting unit is removed from the main unit of the electric apparatus. The display part then displays information in accordance with the detected result by the situation detecting unit.

Therefore, if the accepting unit is removed from the main unit when the electric apparatus malfunctions, it is possible to display procedure information to solve the malfunction. In addition, if the accepting unit is removed from the main unit when the electric apparatus is performing an operation, it is possible to display accomplishment information of the operation. Thus, it has advantages to increase availability for a user.

In addition, it is possible to make the display part display information with so-called universal design, such as larger characters, if the accepting unit is removed from the main unit when the electric apparatus is waiting for an instruction to perform an operation. Thus, it has advantages to increase availability for an aged user, a user with reduced power of vision, or the like.

The above and further objects and features of the invention will more fully be apparent from the following detailed description with accompanying drawings.

DESCRIPTION OF THE PREFERRED EMBODIMENTS

In the following, an electric apparatus according to an aspect of the present invention is detailed based upon drawings showing embodiments thereof that are suitable for digital multi-function machines having e.g. a copy function, a printing function, a facsimile function or the like.

Embodiment 1

Figure 1:
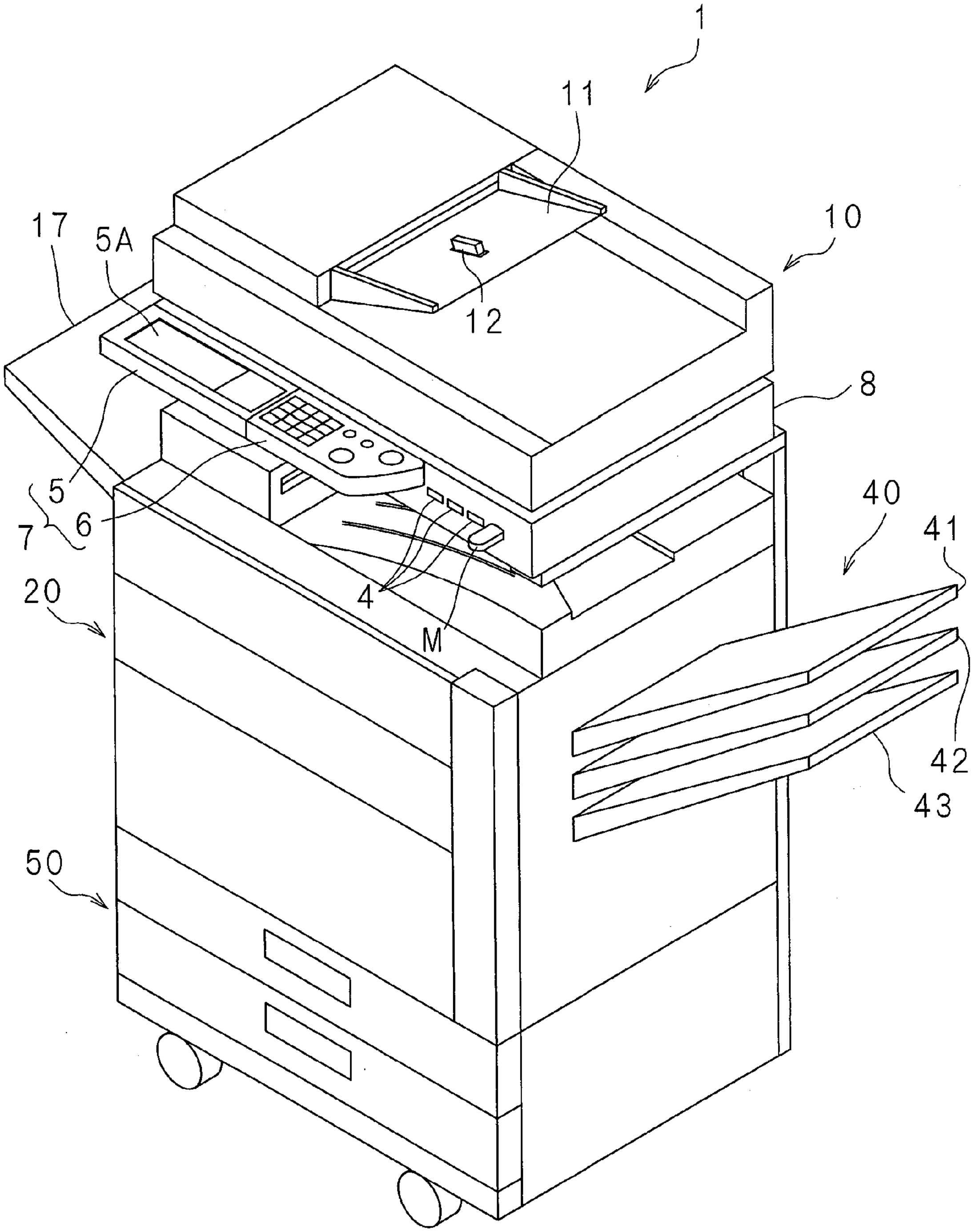
FIG. 1 is an example of perspective view showing a digital multi-function machine in accordance with an embodiment of the present invention.
Figure 2:
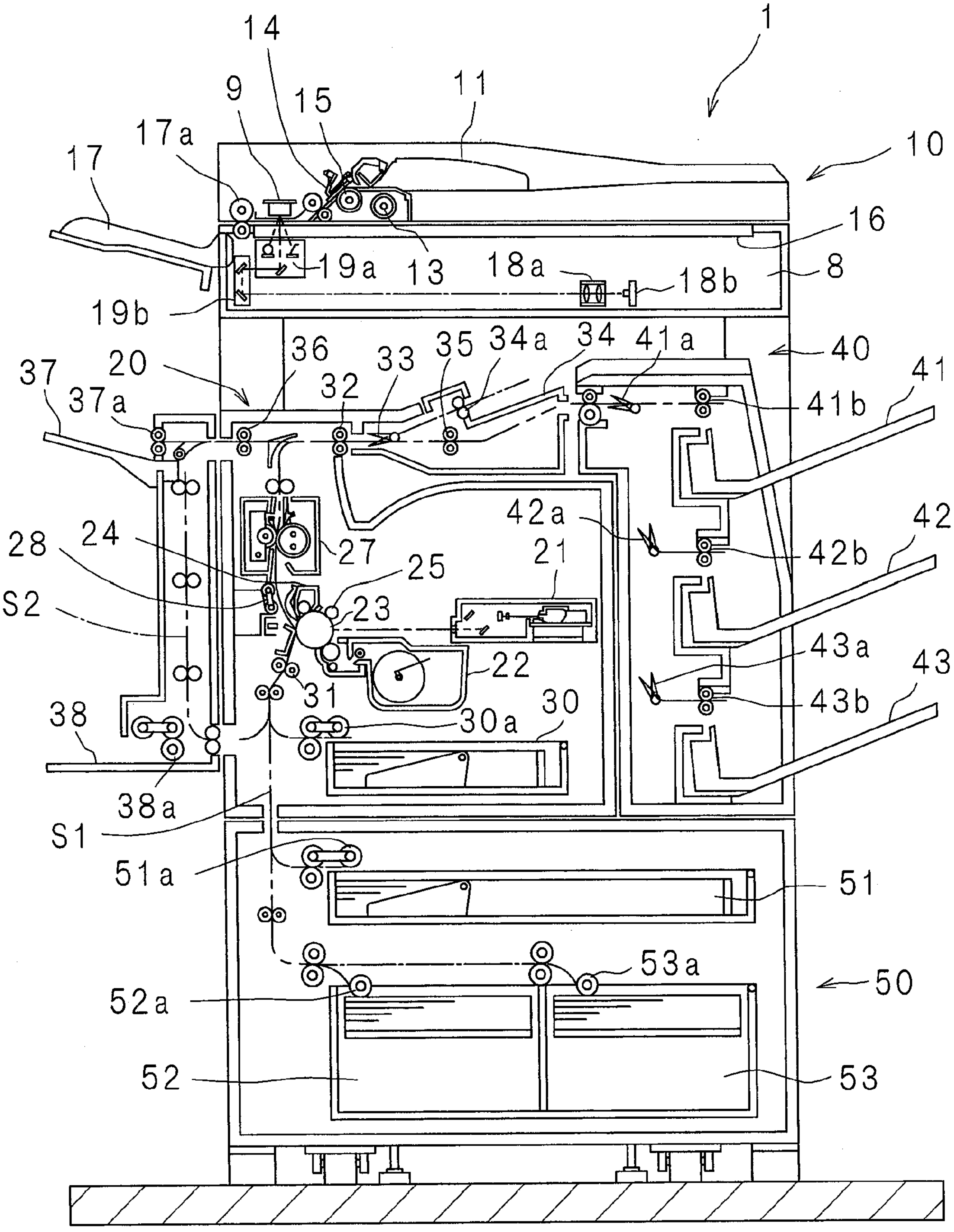
FIG. 2 is a schematic cross-section view showing an inner structure of the digital multi-function machine in accordance with the embodiment of the present invention.

FIG. 1 is an example of perspective view showing a digital multi-function machine in accordance with an embodiment of the present invention. FIG. 2 is a schematic cross-section view showing an inner structure of the digital multi-function machine in accordance with the embodiment of the present invention. The digital multi-function machine in accordance with the embodiment 1 of the present invention includes a main unit 1 and an accepting unit 7 for accepting instructions of users to control the main unit 1. The main unit 1 includes a document reading unit 10 at the top portion. Under the document reading unit 10, the main unit 1 arranges an image forming unit 20 for forming images on papers, and a delivery unit 40 for discharging papers having formed images by the image forming unit 20. Below the delivery unit 40, the main unit 1 arranges a feeding unit 50 for feeding papers to the image forming unit 20, and the like.

The document reading unit 10 arranges an automatic document feeder (ADF) for taking a document consisting of several sheets sequentially into the main unit 1, a scanner platen 16 for placing a document to be read in a proper alignment, a side reading part 8 and a reverse side reading part 9 both for reading images (objects) of the taken documents by the ADF or images (objects) of the placed documents on the scanner platen 16, and the like.

The ADF of the document reading unit 10 arranges a document tray 11 for placing documents to be read with the faces upward, a picking-up roller 13 for taking stacked documents on the document tray 11 singly from the uppermost sheet, a separating plate 14 for preventing from taking more than one sheet at one time, a conveying roller 15 for conveying the taken documents to the scanner platen 16, a delivery tray 17 for discharging documents whose images have been read, a delivery roller 17*a* for conveying documents whose images have been read to the delivery tray 17, a document detecting sensor 12 for detecting the presence of documents, and the like.

The side reading part 8 of the document reading unit 10 arranges a light source section 19*a*, a mirror section 19*b*, an imaging lens 18*a*, a charge coupled device (CCD) 18*b*, and the like.

The light source section 19*a* is configured to focus light emitted from an exposure lamp to a proper position on the scanner platen 16 by a reflector having a concave surface, for reading images of documents. Optical paths of reflected light emitted from documents are rotated by 90 degree by a mirror tilting by 45 degree with respect to a surface of the scanner platen 16. The reflected light is then guided to the mirror section 19*b*. The mirror section 19*b* arranges a pair of mirrors whose reflecting surfaces are positioned orthogonally, to change optical paths of the guided light by 180 degree. In a case that sheets of documents taken by the ADF are read, reading operations are performed with the light source section 19*a* held at a predetermined reading position. In another case that sheets of documents are placed on the scanner platen 16, reading operations are performed with the light source section 19*a* scanning in a parallel direction to the surface of the scanner platen 16.

The imaging lens 18*a* images the reflected light whose optical paths are changed by the mirror section 19*b*, onto the CCD 18*b*. The CCD 18*b* arranges thousands of photo-cells that are substantially aligned. Each photo-cell carries out a photoelectric conversion and outputs analog electrical signals in accordance with amounts of light imaged by the imaging lens 18*a*. The analog electrical signals outputted from the CCD 18*b* are converted into digital signals by an AD converter (not shown). The digital signals are corrected, in consideration of a light distribution feature of the light source at the time reading images of the documents, uneven sensitivity of the CCD 18*b* and the like, to generate image data. The image data generated after such correction is outputted to an image memory 105 (shown in FIG. 6).

On the other hand, the reverse side reading part 9 is for reading images on reverse sides (upward sides) of documents, and positioned upper the scanner platen 16. The reverse side reading part 9 arranges the exposure lamp (such as, light emitting diode array and fluorescent light lamp) for delivering light on the reverse sides of documents, a SELFOC lens array for focusing reflected light of documents pixel-by-pixel, a contact image sensor (CIS) for carrying out photoelectric conversions of the reflected light of documents received through the SELFOC lens array and for outputting analog image signals, and the like.

The image forming unit 20 involves an electrographic process part that carries out image forming operations for papers which are conveyed to the electrographic process part. The electrographic process part arranges a photosensitive drum 23, a charger 25 to charge the photosensitive drum 23, a laser writer 21 for forming latent images on the charged photosensitive drum 23, a developer 22 for developing the latent image on the photosensitive drum 23, a cleaning part 24 for removing developing powders which remains on the photosensitive drum 23 to reuse the photosensitive drum 23, a transfer 28 for transferring toners on photosensitive drum 23 to papers, and the like. In addition, the main unit 1 arranges a branching claw 29 at a connecting position of a main conveying path S1 for printing images on one side of paper and a reverse conveying path S2 for printing images on the other side of paper. The branching claw 29 is utilized to invert papers in accordance with a printing mode of the main unit 1 (such as, both-side printing, one-side printing, black and white printing, and color printing).

Below the process part (at the upper stream), the image forming unit 20 further arranges a feeding box 30 for storing papers. The stored papers in the feeding box 30 singly feed by a picking-up roller 30*a* positioned adjacent to the main conveying path S1. Conveyed papers from the feeding box 30 to the process part are once retained by a resist roller 31. The resist roller 31 releases the retained papers to match edges of toner images on the photosensitive drum 23 with the lead edges of image forming area of the retained papers, in response to rotating photosensitive drum 23.

Under the image forming unit 20, the feeding unit 50 is arranged to include feeding boxes 51, 52, 53 for storing several types of papers. The stored papers in the feeding boxes 51, 52, 53 singly feed to the process part of the image forming unit 20, as described above, by picking-up rollers 51*a*, 52*a*, 53*a* provided respectively to the feeding boxes 51, 52, 53 and positioned adjacent to the main conveying path S1.

Papers being transferred toner images in the process part are conveyed to a fixing part 27 that is arranged at the downstream of the process part. The fixing part 27 arranges a heating roller and a pressing roller. The both rollers rotate the transferred papers with the toner images. The toner images are fixed on the transferred paper, by heat of the heating roller.

The papers being fixed with the toner images by the fixing part 27 are discharged to any one of discharge trays of the digital multi-function machine. A default setting is, for example, configured to control a conveying roller 32 and a switching gate 33 so as to convey papers to be discharged toward a discharging tray 34. The papers to be discharged are, then, discharged with the faces downward on the discharging tray 34. On the other hand, when the papers to be discharged needs to be discharged to a discharging tray 41 of the delivery unit 40, it is configured to change the conveying path of papers to be discharged by the switching gate 33. The papers to be discharged are, then, conveyed to the delivery unit 40 by a conveying roller 35, and discharged onto the discharging tray 41 through a switching gate 41*a* and a discharging roller 41*b*. It is possible to discharge the papers to be discharged onto a discharging tray 42 (or a discharging tray 43), in the same manner as the discharging tray 41, through controlling the conveying path of the paper to be discharged by switching gates 41*a*, 42*a*, 43*a*, and through controlling a discharging roller 42*b* (or a discharging roller 43*b*). Thus, the paper is discharged onto a selected discharging tray.

It will be explained in a case that papers should be discharged with the faces upward or images should be printed on the both sides of papers. After retaining papers once by the conveying rollers 32, 35, it is configured to reversely rotate the conveying rollers 32, 35. The papers to be discharged are, then, conveyed toward the reverse conveying path S2 by a conveying roller 36. If papers should be discharged with the faces upward, the papers are discharged onto a discharging tray 37 through a discharging roller 37*a*. If images should be printed on the both sides of the papers, the papers are conveyed to the resist roller 31 of the image forming unit 20, again, through the reverse conveying path S2. The papers to be printed on the both sides are, then, formed toner images on the reverse side, by the process part of the image forming unit 20. Below the reverse conveying path S2, the digital multi-function machine arranges a manual feeding tray 38. Therefore, it is possible to use several types of papers that are not stored in the feeding boxes 30, 51, 52, 53, through a picking-up roller 38*a*.

Figure 3:
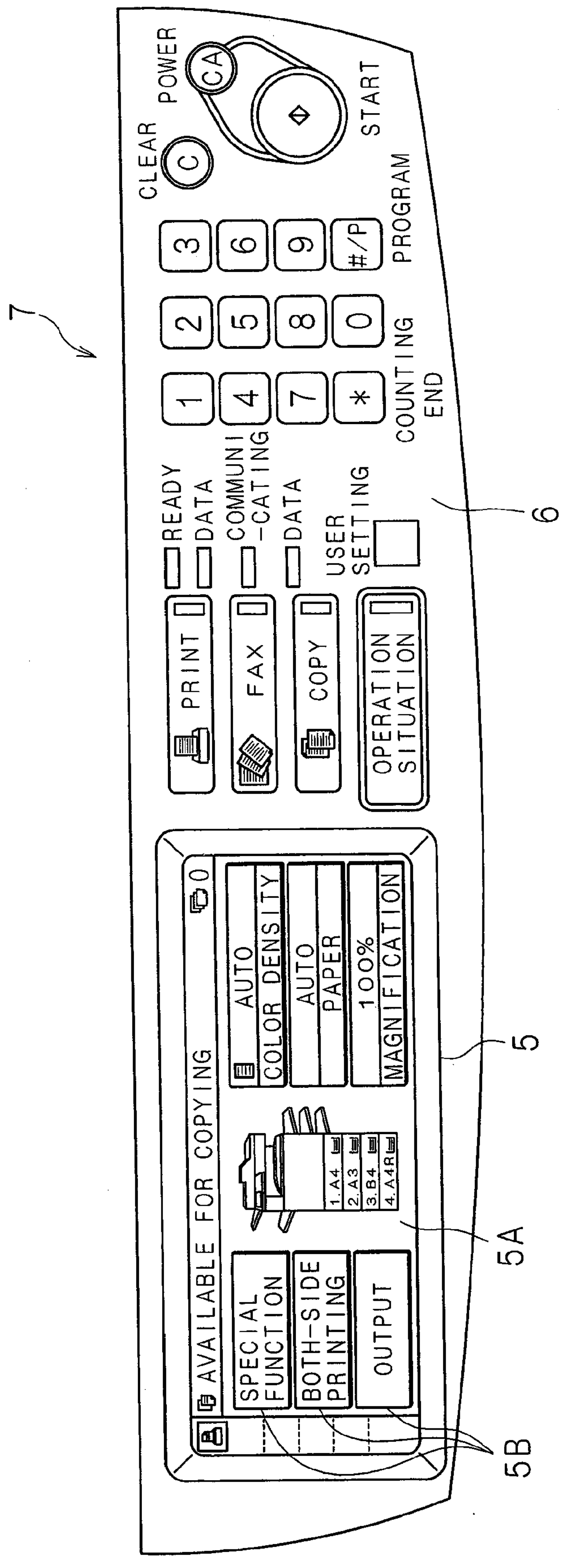
FIG. 3 is an example of accepting unit of the digital multi-function machine in accordance with an Embodiment 1 of the present invention.
Figure 4:
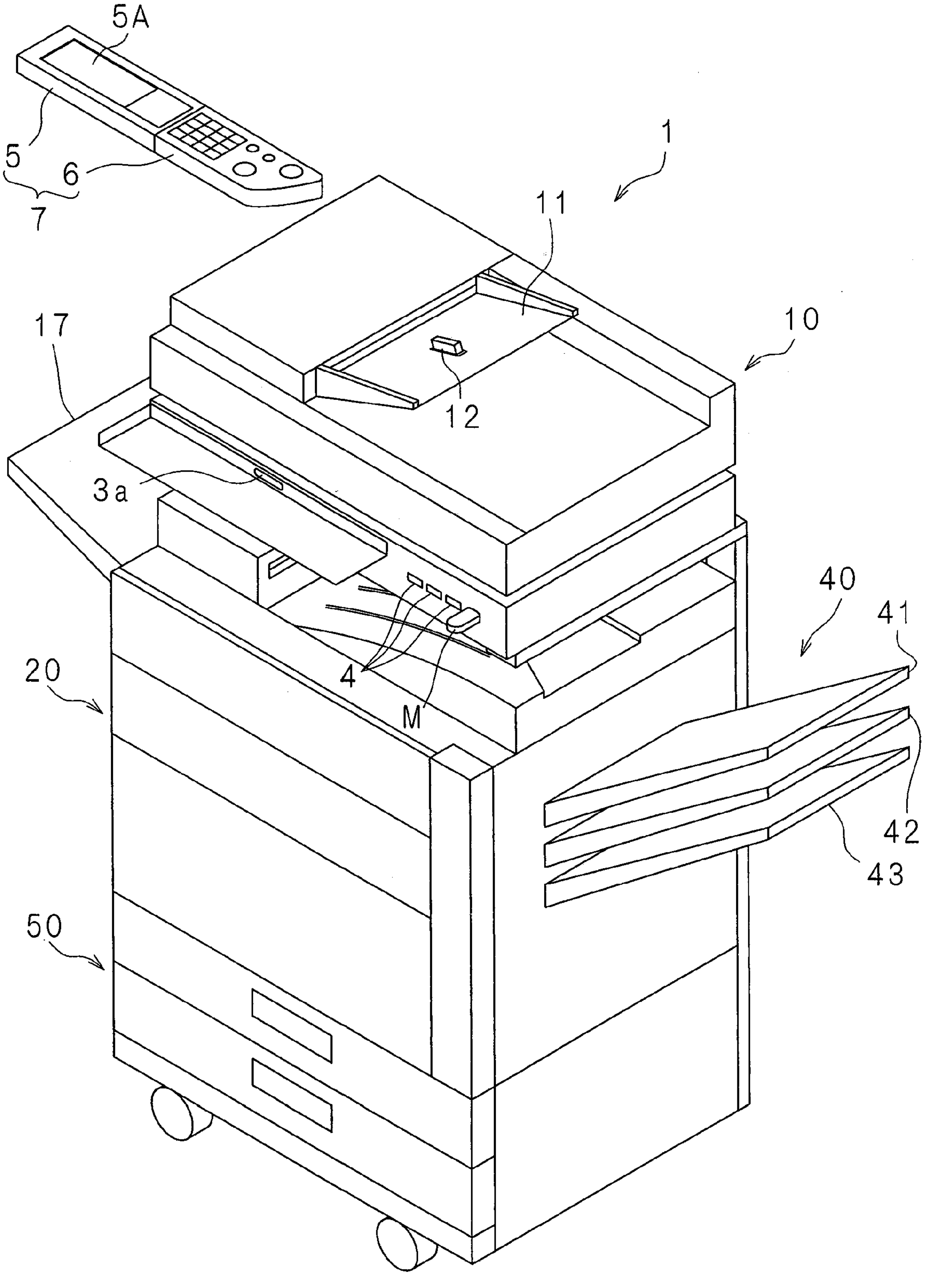
FIG. 4 is a perspective view showing a state where the accepting unit is removed from the digital multi-function machine in accordance with the Embodiment 1 of the present invention.

The digital multi-function machine arranges the accepting unit 7 at a front side of the side reading part 8. The accepting unit 7 is for accepting instructions of users, and consists of a control part 6 through which users input instructions to operate the digital multi-function machine and a display part 5 to show information for users. FIG. 3 is an example of accepting unit 7 of the digital multi-function machine in accordance with the embodiment 1 of the present invention. FIG. 4 is a perspective view showing a state where the accepting unit 7 is removed from the main unit 1.

The control part 6 arranges many hard keys, such as a "copy" keypad to perform a copy operation, a "print" keypad to perform a print operation, a "FAX" keypad to perform facsimile operation, a "operation situation" keypad to show operation situations on the display part 5, a "start" keypad, a numeric keypad, a "power switch" keypad, and the like. The display part 5 is, e.g. a liquid crystal display, for showing images in accordance with the instructions accepted through the control part 6, and images representing the situations of the main unit 1, such as "in waiting", "in performing operations", "in malfunctioning", and the like. The display part 5 also consists of a touchscreen 5A. In short, the display part 5 includes so-called soft keys 5B that perform functions dependent on the character shown near them at that moment on the display part 5. Therefore, the accepting unit 7 can accept instructions through users' finger contacting to the soft keys 5B. In other words, the display part 5 has both functions as the control part 6 and as the accepting unit 7.

The accepting unit 7 is attached to the main unit 1 in a removable manner. During the time when the accepting unit 7 is attached to the main unit 1, the accepting unit 7 carries out a wire communication with the main unit 1. During the time when the accepting unit 7 is removed from the main unit 1, the accepting unit 7 carries out a wireless communication with the main unit 1. The wire communication between the accepting unit 7 and the main unit 1 is performed through a pair of joining terminals 3*a*, 3*b*. The joining terminal 3*b* is arranged on a back side of the accepting unit 7, and is utilized for a serial communication (wire communication) with the main unit 1, described later. The joining terminal 3*a* is arranged on a portion of the main unit 1 corresponding to the joining terminal 3*b*, and is utilized for the serial communication. In addition, the accepting unit 7 arranges a transceiver (not shown). The transceiver plays the wireless communication during the time when the accepting unit 7 is removed from the main unit 1.

The accepting unit 7 can always communicate with the main unit 1, regardless of whether the accepting unit 7 is attached to or removed from the main unit 1. Therefore, it is possible to change information shown on the accepting unit 7, in accordance with the situations of the main unit 1. Furthermore, it is possible to send instructions accepted by the accepting unit 7, to the main unit 1.

Figure 5:
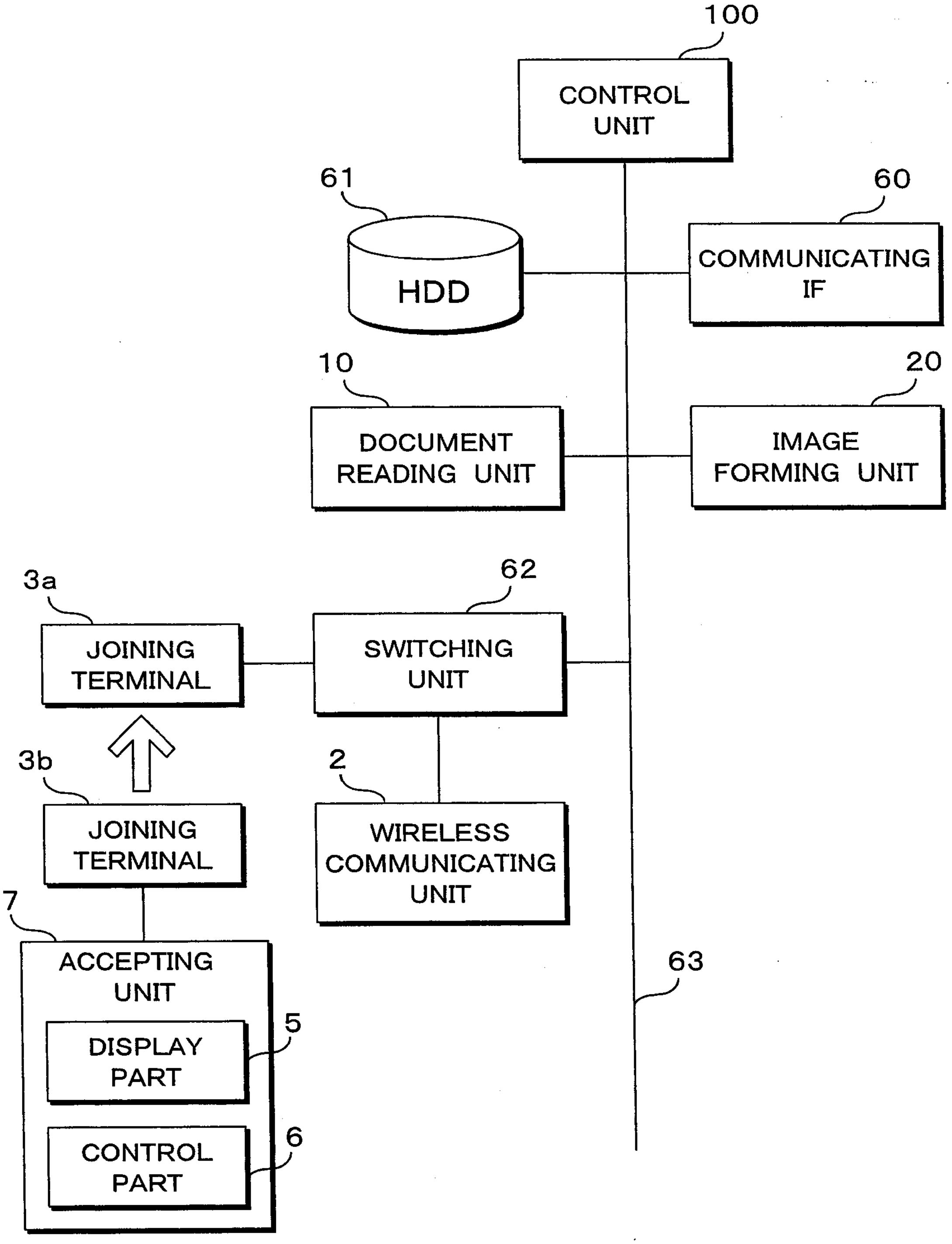
FIG. 5 is a block diagram showing a structure for main parts of the digital multi-function machine in accordance with the Embodiment 1 of the present invention.
Figure 6:
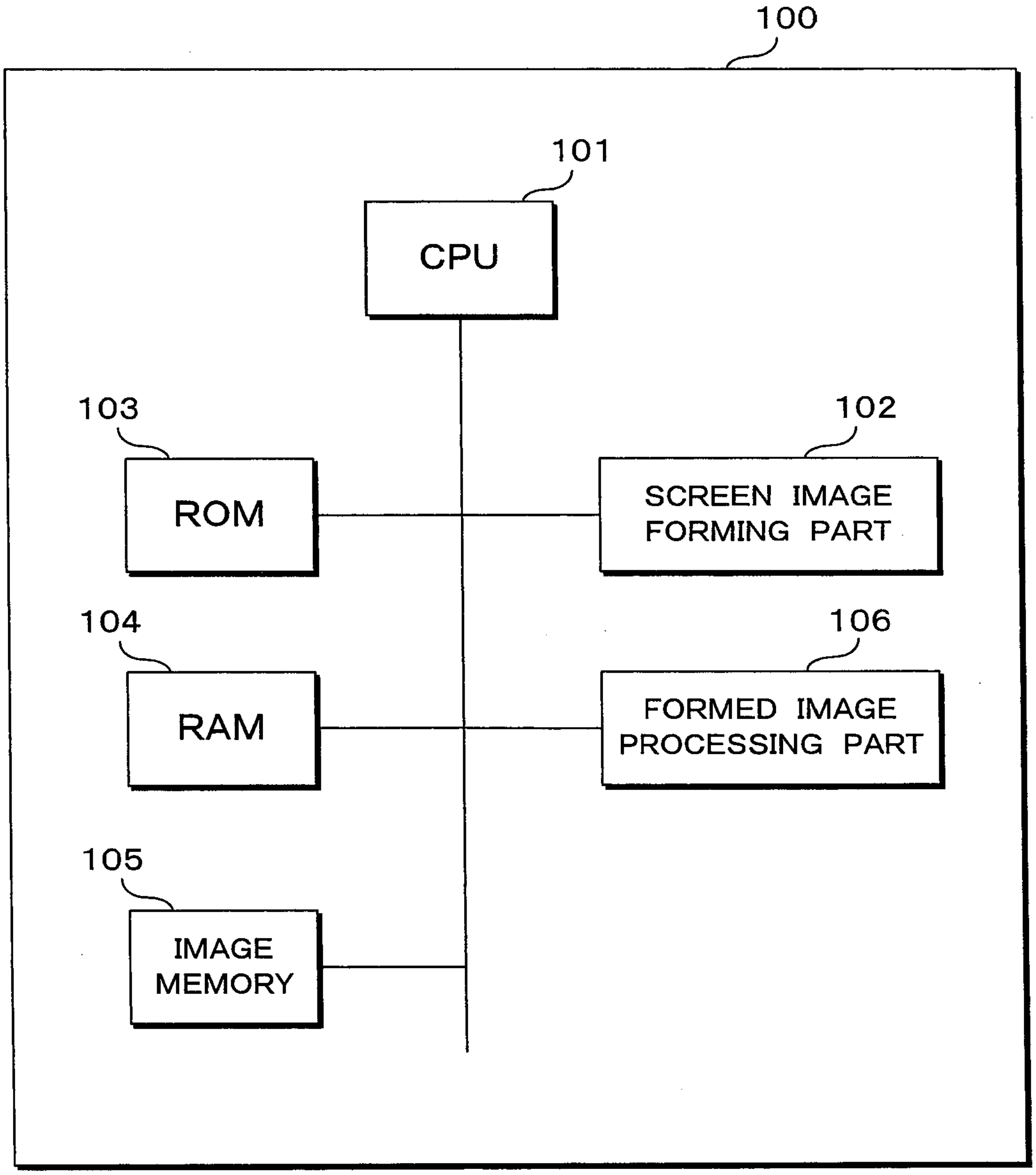
FIG. 6 is a block diagram showing a structure for main sections of control unit of the digital multi-function machine in accordance with the Embodiment 1 of the present invention.

At the front side of the side reading part 8, the digital multi-function machine arranges USB ports 4, 4, . . . , to receive data from external devices. Therefore, it is possible to interface the digital multi-function machine with peripheral devices and portable recording mediums, such as USB memories M, through the USB ports 4, 4, FIG. 5 is a block diagram showing a structure for main parts of the digital multi-function machine in accordance with the embodiment 1 of the present invention. FIG. 6 is a block diagram showing a structure for main sections of control unit 100. The digital multi-function machine arranges the control unit 100 connected, through a bus 63, to plural hardware, such as the document reading unit 10, the image forming unit 20, the accepting unit 7, the joining terminals 3*a*, 3*b*, a wireless communicating unit 2, a switching unit 62, a communicating IF 60, HDD 61 and the like.

The wireless communicating unit 2 arranges a transceiver (not shown) having an IP address, ID or the like, to communicate with another transceiver of the accepting unit 7, in one-to-one correspondence manner. The transceiver of the wireless communicating unit 2 plays the wireless communication with another transceiver of the accepting unit 7, during the time when the accepting unit 7 is removed from the main unit 1.

The switching unit 62 is controlled by the control unit 100 to switch the communication between the accepting unit 7 and the main unit 1, from the wire communication through joining terminals 3*a*, 3*b* to the wireless communication through the wireless communicating unit 2, or from the wireless communication to the wire communication. The joining terminals 3*a*, 3*b* are physical interfaces, such as USB connectors, IEEE1934 connectors, or the like.

The communicating IF 60 arranges physical interfaces to connect to communication networks, such as local area networks, Internet networks, and the like. The digital multi-function machine in accordance with the embodiment 1 of the present invention establishes connections to external devices through the communicating IF 60. Therefore, the digital multi-function machine can receive several types of data from the external devices to which connections are established.

The HDD 61 is a storage device having magnetic recording media. A storage area of the HDD 61 is utilized as a data storage area to store several types of data. The HDD 61 stores, for example, image data obtained by reading documents at the document reading unit 10, image data corresponding to print operation received from the communicating IF 60, and the like.

The control unit 100 arranges a CPU 101, a ROM 103, a RAM 104, an image memory 105, a formed image processing part 106, a screen image forming part 102, and the like.

The CPU 101 executes control programs pre-stored in the ROM 103, while loading the control programs onto the RAM 104. Thus, the CPU 101 controls plural hardware described above, and makes whole the digital multi-function machine perform as the electric apparatus in accordance with the present invention. The CPU further determines whether the accepting unit 7 is removed from the main unit 1 or not, detects the situations of the main unit 1, and the like. The ROM 103 stores, as well as the control programs, other programs to form images that should be shown on the display part 5, such as guidance images to solve paper jams, images to show a progress of accomplishment of performing operation, changed images with e.g. different size of displaying character, changed images with different area of soft key 5B, and the like.

The screen image forming part 102 forms images to be shown on the display part 5, in accordance with stored data in the ROM 103. For example, the screen image forming part 102 changes images to be shown on the display part 5, on the basis of the instruction accepted through the control part 6.

The image memory 105 stores, for example, image data obtained from the document reading unit 10, image data corresponding to print operation received through the communicating IF 60, image data to be processed by the formed image processing part 106, image data formed by the screen image forming part 102, and the like. In addition, a part of storage area of the image memory 105 stores data corresponding to images to be shown on the display part 5: such as images to be shown during waiting situations, i.e. images representing situations that the digital multi-function machine is waiting for an instruction and is held in reserve ready for performing an operation; images to be shown during operation situations, i.e. images representing a situation that the digital multi-function machine is performing at least an operation in accordance with an accepted instruction; images to be shown during malfunction situations, i.e. images representing a situation that the digital multi-function machine is malfunctioning or improperly performing; guidance images to solve the malfunctions; images to show a progress of accomplishment of performing operation; changed images with different size of displaying character; changed images with different area of soft key 5B, and the like.

During the waiting situations, the display part 5 displays e.g. a perspective image of whole the digital multi-function machine in accordance with the present invention, plural soft keys for several operations, a text showing the waiting situations for users or a text showing the possibility to accept another instruction of users (for example, "available to copy" and "ready for use"), and the like. As for changed images with different size of displaying character or changed images with different area of soft key 5B, the display part 5 displays images whose soft keys for basic operations or important functions are changed larger in the sizes and areas than those during the waiting situations. The display part 5 may display a text showing the waiting situations for users, with larger characters.

The images shown during the operation situations are not dramatically different from those shown during the waiting situations. During the operation situations, the display part 5 may display a text showing, for users, what operation the main unit 1 is performing now. For example, the display part 5 may display a text "copying" or a text "sending images". As for images to show a progress of accomplishment of performing operation, the display part 5 may display a text representing what operation the main unit 1 is performing now, a text representing how much of the operation the main unit 1 has accomplished, an operation list representing what operation the main unit 1 performs next, an operation list representing which operations the main unit 1 is performing now, and the like.

During malfunction situations, the display part 5 displays images representing contents of the malfunctions, information representing malfunctioned sites, soft keys to accept instructions for showing details on how to handle the malfunctions, and the like. For example, when a paper jam has occurred at a feeding box, the display part 5 displays a text "paper is jammed" and information representing that the feeding box is the paper jam occurred site (for example, utilizing an image arrow head pointing jam occurred site on the perspective image of whole the digital multi-function machine, or flashing the paper jam occurred site on the perspective image of whole the digital multi-function machine). As for the guidance images to solve the malfunctions, the display part 5 displays details on how to handle the malfunctions by users themselves. For example, when a paper jam has occurred at a feeding box, the display part 5 displays a text "pull out the feeding box and clean the jammed paper", an image explaining how to pull out the feeding box, and the like.

The formed image processing part 106, for example, processes images stored in the image memory 105 in accordance with instructions accepted through the accepting unit 7. Specifically, the formed image processing part 106 carries out scaling processes on the basis of the images stored in the image memory 105.

Figure 7:
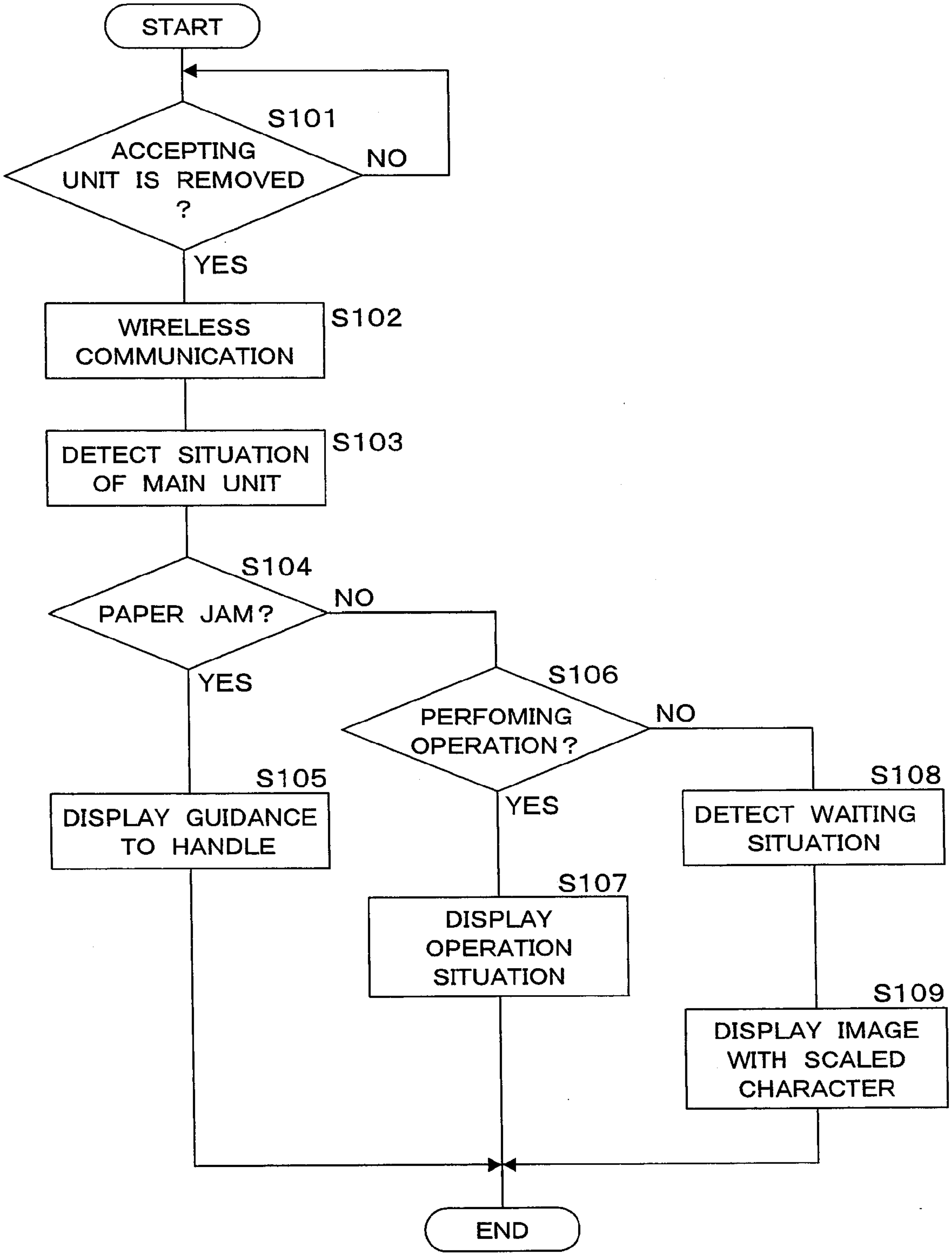
FIG. 7 is a flowchart showing a procedure performed by a CPU of the digital multi-function machine in accordance with the Embodiment 1 of the present invention.

FIG. 7 is a flowchart showing a procedure performed by a CPU 101 of the digital multi-function machine in accordance with the embodiment 1 of the present invention. For illustration purposes, the digital multi-function machine is assumed to have the main unit 1 whose situations belong within three categories: waiting situations; operation situations; and malfunction situations.

The operation situations mean that the main unit 1 is performing at least one operation, such as copying, printing, facsimileing, and the like. As for copying, the operation situations mean that the main unit 1 is reading documents, taking papers into, forming images in accordance with image data obtained from the read documents, or taking away jammed papers after forming images in accordance with image data obtained from the read documents, or the like. As for printing, the operation situations mean that the main unit 1 is receiving image data to be printed from an external device, reading out pre-stored image data, taking papers into, forming images in accordance with the received or pre-stored image data, or taking away jammed papers after forming images in accordance with the received or pre-stored image data, or the like. As for facsimileing, the operation situations mean that the main unit 1 is reading documents, sending read image data, receiving image data to be printed from an external device, taking papers into, forming images in accordance with the received image data, or taking away jammed papers after forming images in accordance with the received image data, or the like.

The waiting situations mean that the main unit 1 is performing no operation for copying, printing, and facsimileing, and keeps no instructions of users.

The malfunction situations mean that the main unit 1 cannot properly perform operations in accordance with the accepted instructions, because of paper empty, paper jam, low toner, communication stop with external devices, or the like. Hereafter, it will be illustrated with occurrence of the paper jam as an example of the malfunction situations.

When the digital multi-function machine in accordance with the embodiment 1 of the present invention is powered on, the main unit 1 becomes in the waiting situations. The display part 5 then displays plural soft keys 5B for "several operations and a text such as available for copying" showing the waiting situations for users, as described above. When the digital multi-function machine accepts an instruction of user through the hard keys and soft keys, the main unit 1 performs several operations and becomes in the operation situations. When there is an occurrence of paper empty, paper jam, low toner, or the like, during performing an operation in accordance with the accepted instruction, the main unit 1 becomes in the malfunction situations. When the operation in accordance with the accepted instruction is properly accomplished or the occurred paper empty, paper jam, low toner, or the like is properly solved, the main unit 1 becomes again in the waiting situations. In short, the situations of the main unit 1 belong within three categories: waiting situations; operation situations; and malfunction situations, when the digital multi-function machine is powered on. Hereinafter, it will be illustrated the case that the accepting unit 7 is removed from the main unit 1 during the waiting situations, the operating situations or the malfunction situations. Before removed from the main unit 1, the accepting unit 7 carries out the wire communication with the main unit 1 through the joining terminals 3*a*, 3*b*.

The CPU 101 determines whether the accepting unit 7 is removed from the main unit 1 or not (S 101). This determination is carried out by detecting conductions between the joining terminals 3*a*, 3*b*. In other words, the CPU 101 determines that the accepting unit 7 is attached to the main unit 1, when the CPU detects the conductions between the joining terminals 3*a*, 3*b*. On the other hand, the CPU 101 determines that the accepting unit 7 is removed from the main unit 1, when the CPU 101 detects no conductions between the joining terminals 3*a*, 3*b*.

When the CPU 101 determines that the accepting unit 7 is attached to the main unit 1 (S 101: NO), the CPU 101 repeats the determination S 101 until the accepting unit 7 is removed from the main unit 1. During the time repeating the determination S 101, images being displayed on the display part 5 are not changed without accepting an instruction of users through the hard keys or the soft keys. On the other hand, when the CPU 101 determines that the accepting unit 7 is removed from the main unit 1 (S 101: YES), the wireless communication is carried out (S 102). In other words, the CPU 101 controls the switching unit 62 to stop the wire communication through the joining terminals 3*a* and 3*b* and to activate the wireless communicating unit 2. Thus, the wireless communication is carried out through the transceiver of the wireless communication unit 2 and another transceiver of the accepting unit 7.

The CPU 101 then detects the situation of the main unit 1 at the time when the accepting unit 7 is removed from the main unit 1 (S 103). In other words, the CPU 101 determines whether the main unit 1 is performing an operation, such as copying, printing, sending data, or the like, is performing no operation (or waiting for instructions of users), or is malfunctioning because of paper empty, paper jam, or the like.

For example, the CPU 101 determines that the main unit 1 is in the operation situations, e.g. in a case that the CPU 101 detects a document on the document tray 11 through a document detecting sensor 12 after accepting an instruction of users for an operation, in a case that the CPU 101 detects a heat roller of the fixing part 27 having higher temperature than a predetermined value after accepting the instruction, or in a case that the CPU 101 detects an applied drive voltage onto the side reading part 8, the reverse side reading part 9, the process part or the like after accepting the instruction. The CPU 101 determines that the main unit 1 is in the waiting situations, when the main unit 1 is determined not in the operation situations described above and there are no operation in accordance with accepted instructions and no reserved operation.

As for malfunction situations, the CPU 101 determines that paper empty is occurred, for example with paper detecting sensors arranged on the manual feeding tray 38 or the feeding boxes 30, 51, 52, 53. The CPU 101 determines that paper jam is occurred, for example with delivery detecting sensors to sense delivery of papers, when the delivery detecting sensors do not sense a delivery of papers passed through the picking-up rollers 38*a*, 51*a*, 52*a*, 53*a*, within a predetermined time. The CPU 101 determines that short-circuits is occurred, for example with conduction sensors to sense conductions of the side reading part 8, the reverse side reading part 9 and the process part, when the conduction sensors do not sense conductions. The CPU 101 determines that low toner is occurred, for example with a toner sensor to sense toner amounts (e.g. per unit time) discharged from toner discharge ports of toner cartridges, when the discharged toner amounts are lower than a predetermined value.

The CPU 101 determines whether the main unit 1 is in the situations of paper jam or not (S 104). When the CPU 101 determines that the main unit 1 is in the situations of paper jam (S 104: YES), the CPU 101 controls the screen image forming part 102 to form guidance images to solve the paper jam. The screen image forming part 102 forms the guidance images in accordance with data stored in the image memory 105. The guidance images formed by the screen image forming part 102 are then displayed on the display part 5 (S 105). In other words, when the main unit 1 attaching the accepting unit 7 is in the malfunction situations (paper jam), the display part 5 firstly shows information representing the occurrence of the paper jam, the occurred site of the paper jam, and the like. Then, when the accepting unit 7 is removed from the main unit 1, the display part 5 shows the guidance images representing details on how to solve the paper jam.

Figure 8:
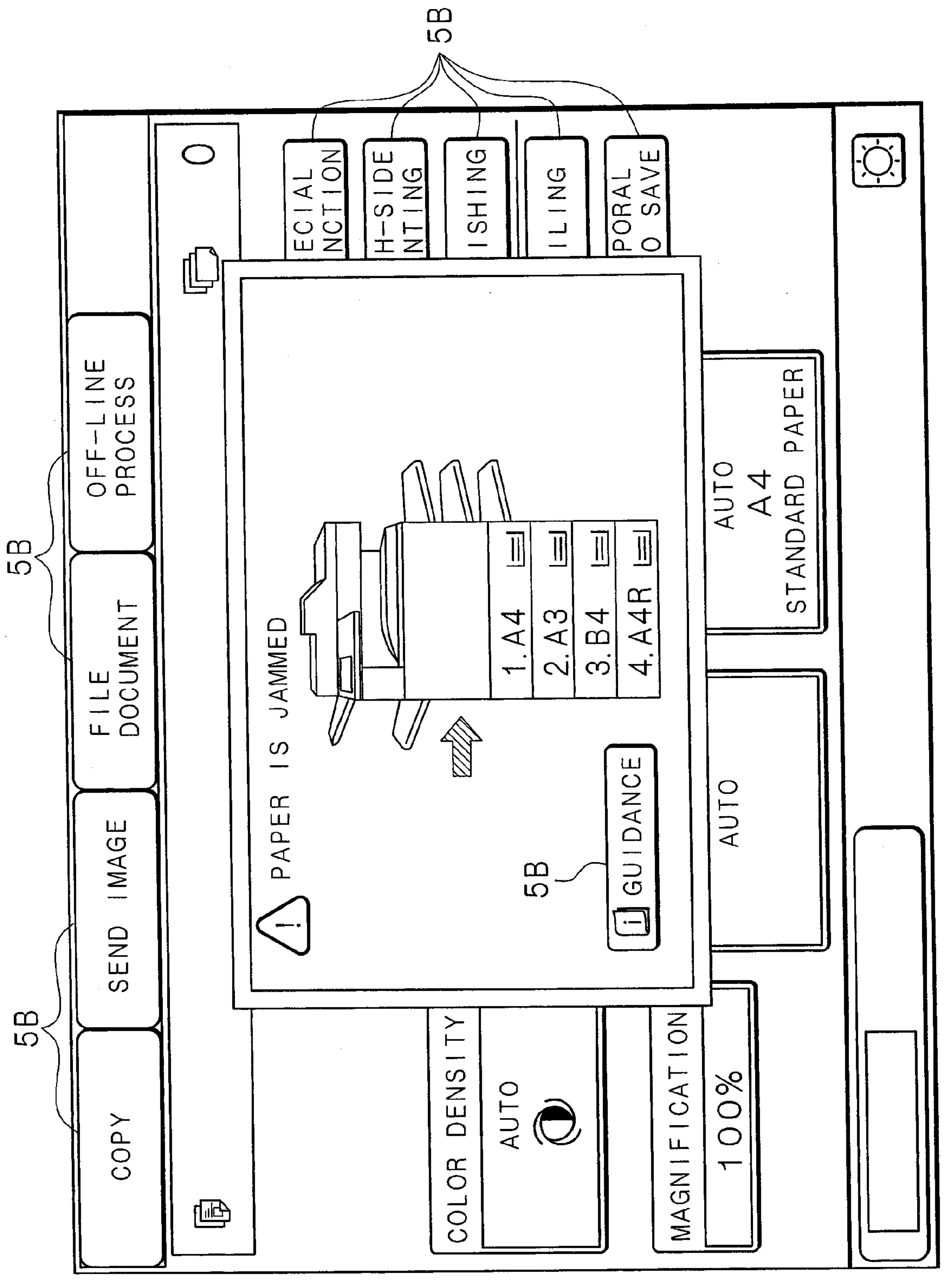
FIG. 8 is an example of display image on a display part before the accepting unit is removed from a main unit, when the main unit malfunctions because of a paper jam.
Figure 9:
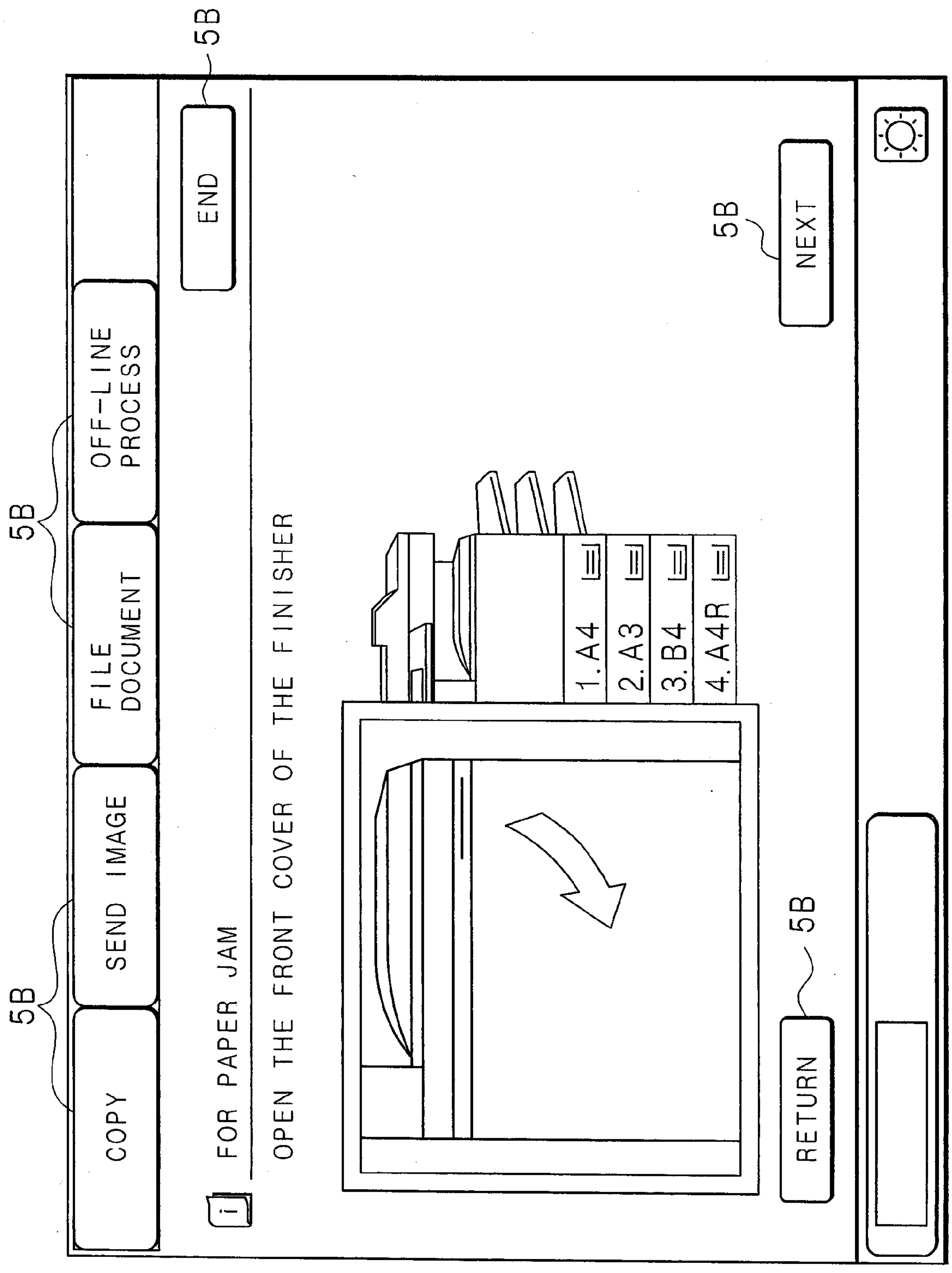
FIG. 9 is an example of display image on the display part after the accepting unit is removed from the main unit, when the main unit malfunctions because of the paper jam.

Hereinafter, it will be illustrated the change of the images on the display part 5 during the occurrence of the paper jam, with referring to FIG. 8 and FIG. 9, before and after removing the accepting unit 7 from the main unit 1. FIG. 8 is an example of display image on the display part 5 before the accepting unit 7 is removed from the main unit 1. FIG. 9 is an example of display image on the display part 5 after the accepting unit 7 is removed from the main unit 1. Before removing the accepting unit 7 from the main unit 1, the display part 5 shows a text "paper is jammed" to represent the occurrence of the paper jam, an image arrow head pointing the paper jam occurred site, and a soft key 5B "guidance" to accept instructions for showing details on how to handle the paper jam. The text, image arrow head and "guidance" may be showed in a pop-up window manner. After removing the accepting unit 7 from the main unit 1, the display part 5 shows a text "open the front cover of the Finisher" corresponding to details on how to handle the paper jam and shows an explanation drawing to supplement the text. Before removing the accepting unit 7 from the main unit 1, these text and explanation drawing should be displayed by selecting the soft key 5B "guidance" shown on the display part 5. The configurations according to the present invention allow users to skip inputting an instruction through the soft key 5B "guidance". Therefore it has advantages to provide convenience for users. The users can come to the paper jam occurred site with the removed accepting unit 7, and can handle the paper jam while confirming the guidance images displayed on the display part 5.

In other words, when the CPU 101 determines that the main unit 1 is in the malfunction situations, the display part 5 displays information for showing the malfunction occurred site and for solving the occurred malfunction.

When the CPU 101 determines that the main unit 1 is not in the situations of paper jam (S 104: NO), the CPU 101 further determines whether the main unit 1 is in the operation situations or not (S 106). When the CPU 101 determines that the main unit 1 is in the operation situations (S 106: YES), the CPU 101 controls the screen image forming part 102 to form images representing a progress of accomplishment of the performing operation. The screen image forming part 102 forms the images representing a progress of accomplishment of the performing operation in accordance with data stored in the image memory 103. The formed images by the screen image forming part 102 are displayed on the display part 5 (S 107). In other words, when the main unit 1 attaching the accepting unit 7 is in the operation situations, such as copying, printing, sending data, or the like, the display part 5 firstly shows a text showing what operation the main unit 1 is performing. Then, when the accepting unit 7 is removed from the main unit 1, the display part 5 shows information representing what operation the main unit 1 is performing now, a text representing how much of the operation the main unit 1 has accomplished, an operation list representing what operation the main unit 1 performs next, and the like.

Figure 10:
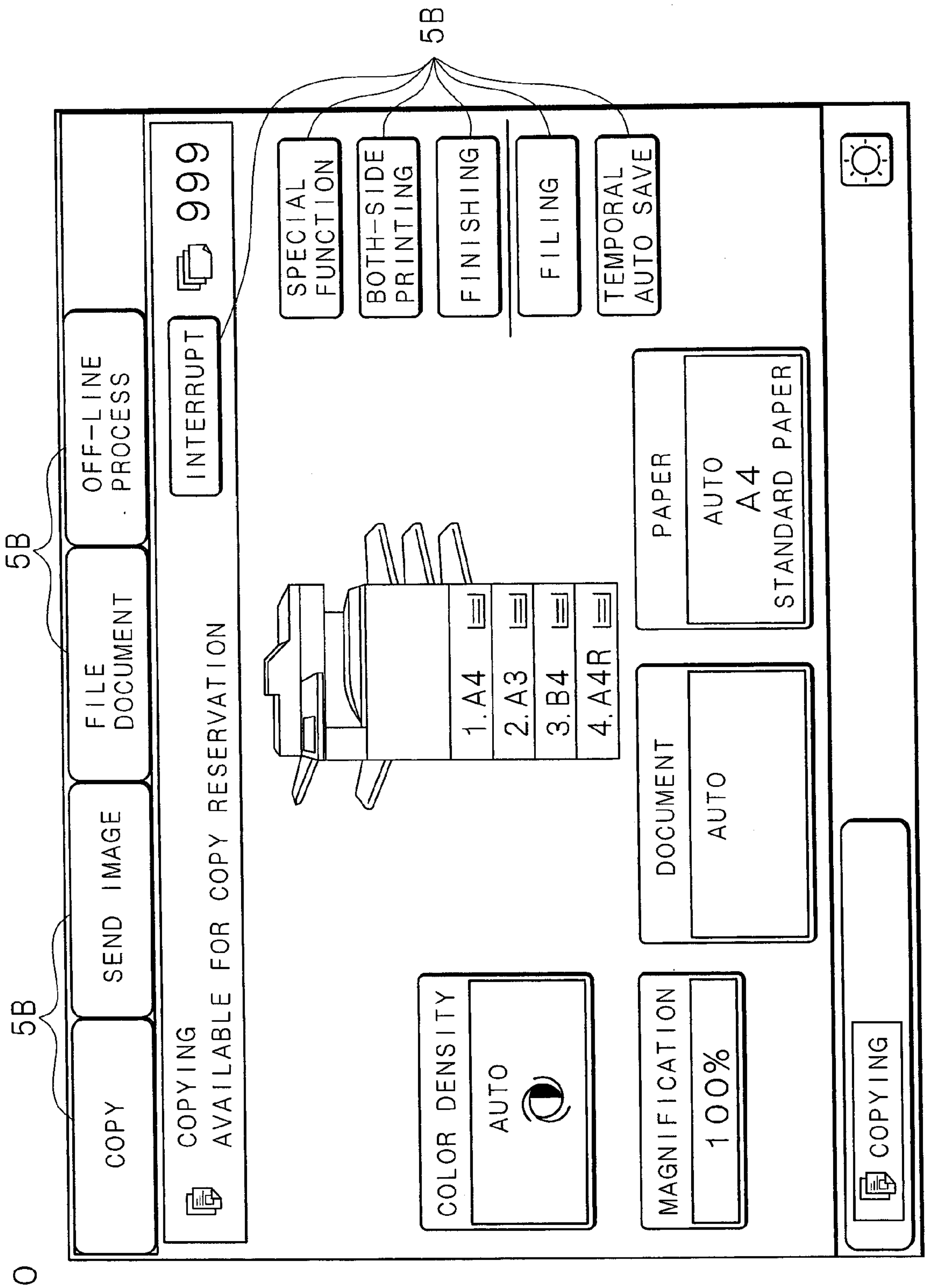
FIG. 10 is an example of display image on the display part before the accepting unit is removed from the main unit, during the time when the main unit is performing an operation.
Figure 11:
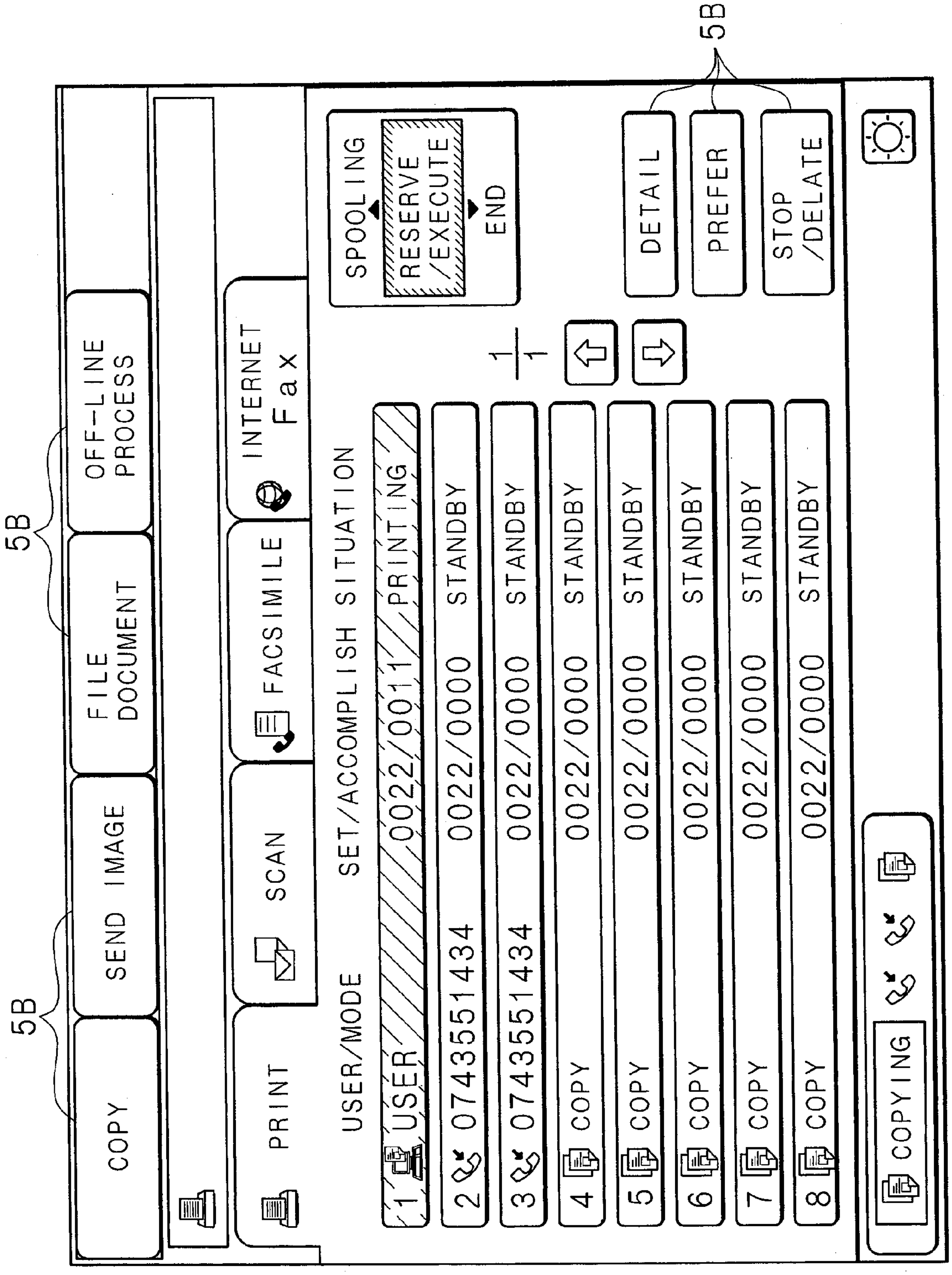
FIG. 11 is an example of display image on the display part after the accepting unit is removed from the main unit, during the time when the main unit is performing the operation.

Hereinafter, it will be illustrated about the change of the images on the display part 5 during the operation situations, with referring to FIG. 10 and FIG. 11, before and after removing the accepting unit 7 from the main unit 1. FIG. 10 is an example of display image on the display part 5 before the accepting unit 7 is removed from the main unit 1. FIG. 11 is an example of display image on the display part 5 after the accepting unit 7 is removed from the main unit 1. Before removing the accepting unit 7 from the main unit 1, the display part 5 shows a text "copying; available for copy reservation" to represent that the copying operation is performed. After removing the accepting unit 7 from the main unit 1, the display part 5 shows information representing that the main unit 1 is performing copy operation now, information representing how much of the copy operation the main unit 1 has accomplished, and an operation list representing e.g. that sending data and printing will be sequentially performed next. Before removing the accepting unit 7 from the main unit 1, these information and list should be displayed on the display part 5 by selecting the "operation situation" keypad of the hard keys. The configurations according to the present invention allow users to skip inputting an instruction through the "operation situation" keypad. Therefore, it has advantages to provide convenience for users. For example, when users need to copy for many documents, the users can go back to own work desk with the removed accepting unit 7, and can work different jobs until the accomplishment of the copy operation while confirming the operation (copying) situation.

When the CPU 101 determines that the main unit 1 is not in the operation situations (S 106: NO), the CPU 101 further determines that the main unit 1 is in the waiting situations (S 108). In other words, the CPU 101 determines the main unit 1 is in the waiting situations when the main unit 1 is not both in the situations of paper jam and in the operation situations, because the situations of the main unit 1 belong within three categories: waiting situations; operation situations; and malfunction situations. The CPU 101 controls the screen image forming part 102 to form images with different size of character to be shown the display part 5 (enlarging or reducing size of character shown the display part 5 before removing the accepting unit 7). The screen image forming part 102 forms the images with different size of character in accordance with data stored in the image memory 105. The images formed by the screen image forming part 102 are displayed on the display part 5 (S 109). In other words, when the main unit 1 attaching the accepting unit 7 is in the waiting situations, not in the operation situations, such as copying, printing, sending data, or the like, the display part 5 firstly shows a text representing that the present situation of the main unit 1 is in the waiting situations and shows a text representing that the main unit 1 can accept users' instructions. Then, when the accepting unit 7 is removed from the main unit 1, the display part 5 shows images with enlarged or reduced size of characters, with respect to images shown on the display part 5 before removing the accepting unit 7. When the accepting unit 7 is removed from the main unit 1 during the waiting situations of the main unit 1, it can be considered that users have removed the accepting unit 7 to see information displayed on the display part 5, because the accepting unit 7 is arranged beyond a range that users, such as a user in a wheelchair, an intellectually disabled user, an aged user, or the like can see the shown information although being arranged within a range that such users can touch. In view of this consideration, the display part 5 shows images with so-called universal design, such as larger characters for important information while smaller characters for unimportant information, and the like.

The display part 5 is explained to display images with scaled character size at S 109, for illustration purposes. It should be noted that the present invention is not limited to the images with scaled character size. At S 109, the display part 5 may display different images whose visual identifications are improved for an intellectually disabled user, an aged user, a user with reduced power of vision, or the like, in accordance with the object according to the present invention. In addition, the digital multi-function machine may arrange a switch key to return the images with scaled character size to the images with un-scaled character size, for a case that healthy users have removed the accepting unit 7 from the main unit 1 during the waiting situations.

In the embodiment 1, the display part 5 is explained to display information for performing operation, when the accepting unit 7 is removed from the main unit 1 during the operation situations, for illustration purposes. It should be noted that the present invention is not limited to these configurations. For example, the digital multi-function machine may further arrange a clock means. Then, the digital multi-function machine may display information for present operation on the display part 5, when the accepting unit 7 is removed within a predetermined time after the main unit 1 has started to perform an operation. Further, the digital multi-function machine may display images with scaled character size on the display part 5, when the accepting unit 7 is removed beyond a predetermined time after the main unit 1 has started to perform an operation.

Figure 12:
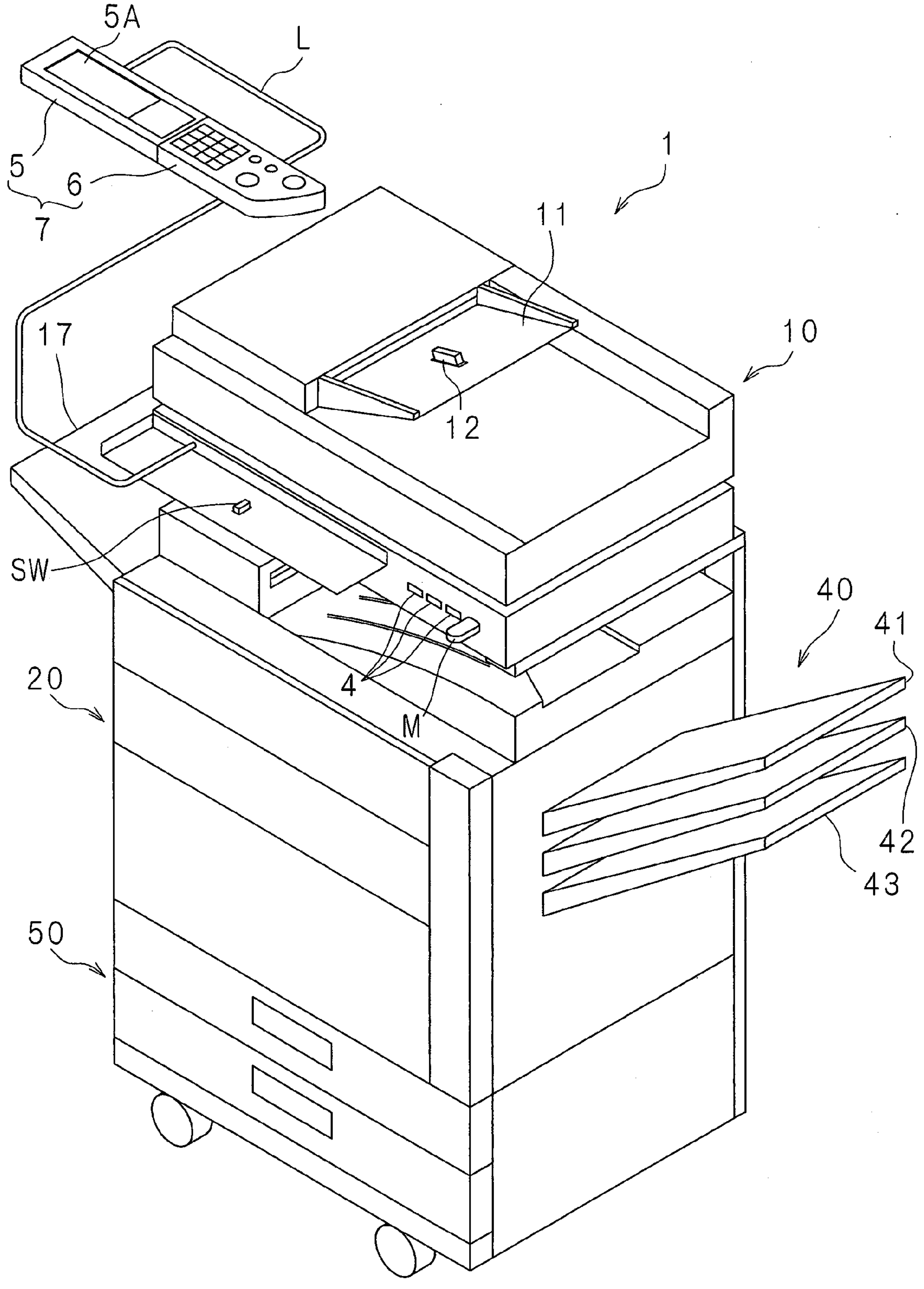
FIG. 12 is an example of perspective view showing a digital multi-function machine in accordance with another embodiment of the present invention.

It has been explained, for illustration purposes, that the wire communication is carried out when the accepting unit 7 is attached to the main unit 1, and that the wireless communication is carried out when the accepting unit 7 is removed from the main unit 1. The digital multi-function machine in accordance with the embodiment of the present invention may arrange a cord L that connects the accepting unit 7 with the main unit 1 to carry out the wire communication anytime, as shown in FIG. 12. Even in this configuration, the CPU 101 of the digital multi-function machine performs similar procedures to those described above. Of course, there are some differences between the procedures of this configuration with the cord L and those described above. For example, the procedures of this configuration with the cord L do not necessary have a process of those described above, as shown in FIG. 7, that detects conductions between the joining terminals 3*a*, 3*b* through on/off of a remove detecting switch SW arranged on an attachment part for the accepting unit 7 of the main unit 1 (S 101), and a process of those described above that changes from the wire communication to the wireless communication (S 102), because of carrying out the wire communication anytime. However, basic processes are similar between the procedures of this configuration with the cord L and those described above as shown in FIG. 7.

Embodiment 2

Figure 13:
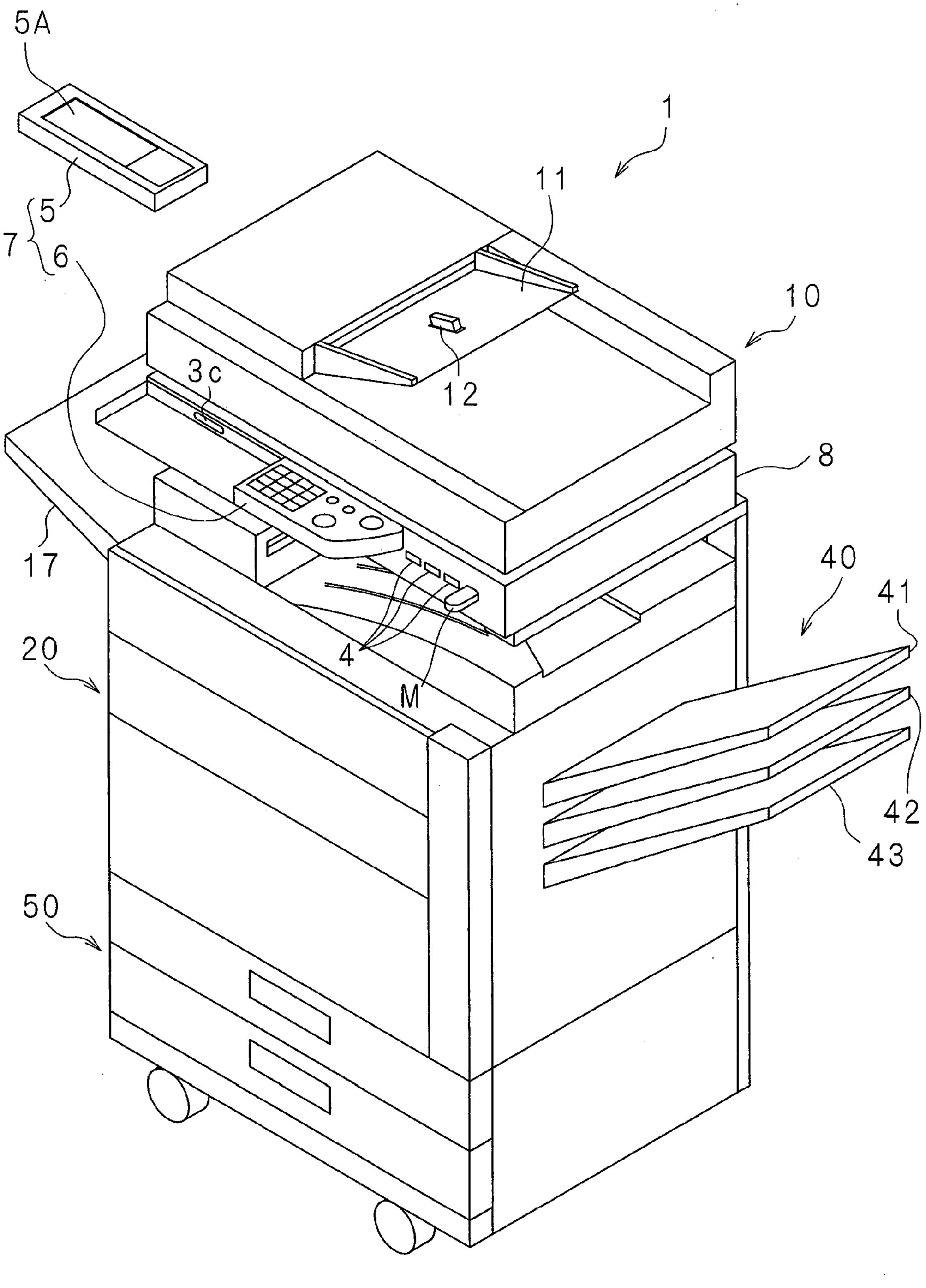
FIG. 13 is a perspective view showing a state where an accepting unit is removed from a digital multi-function machine in accordance with an Embodiment 2 of the present invention.
Figure 14:
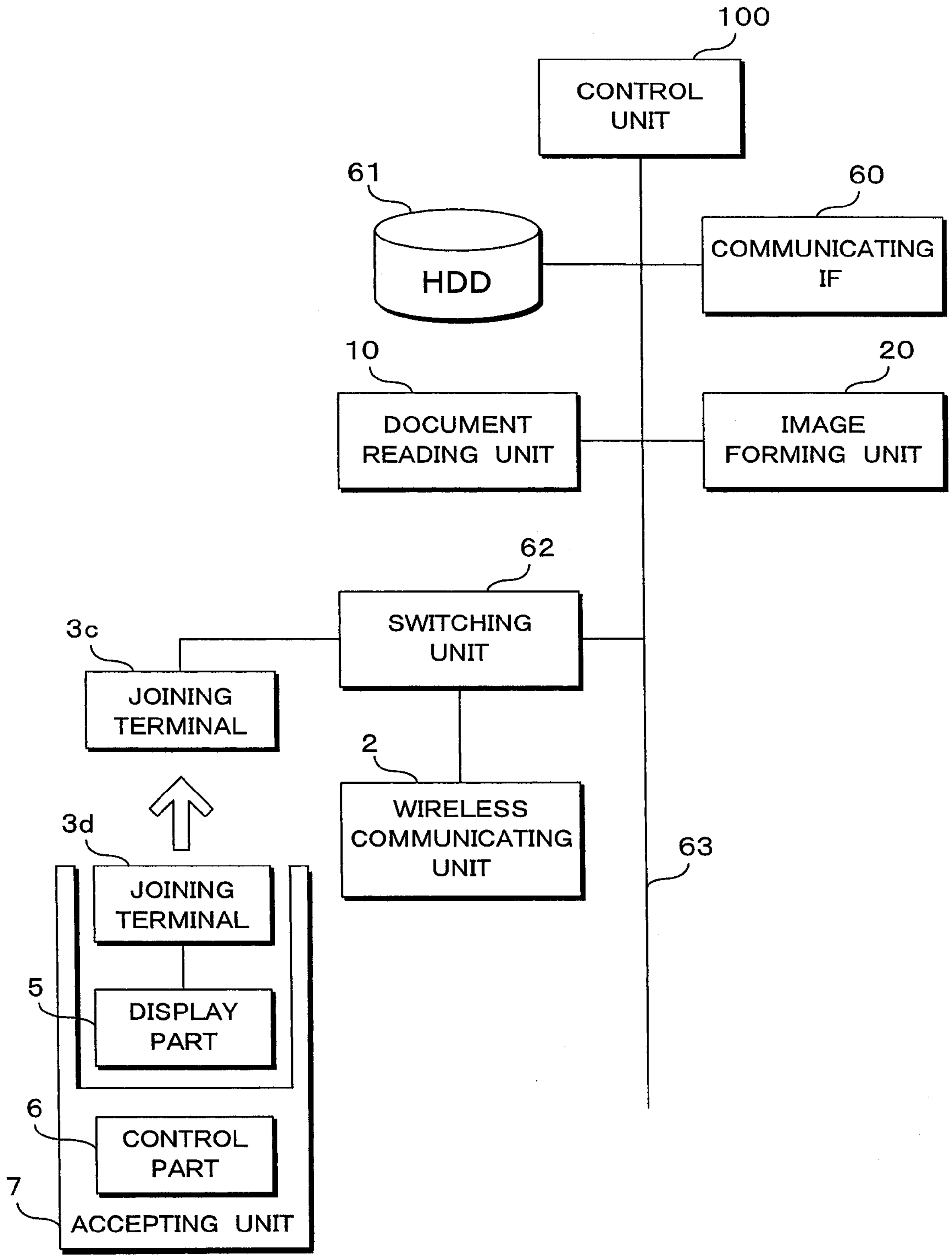
FIG. 14 is a block diagram showing a structure for main parts of the digital multi-function machine in accordance with the Embodiment 2 of the present invention.

FIG. 13 is a perspective view showing a state where an accepting unit 7 is removed from a digital multi-function machine in accordance with embodiment 2 of the present invention. FIG. 14 is a block diagram showing a structure for main parts of the digital multi-function machine in accordance with the embodiment 2 of the present invention. The digital multi-function machine in accordance with the embodiment 2 of the present invention is configured that only the display part 5 of the accepting unit 7 is removable from the main unit 1. When attached to the main unit 1, the display part 5 carries out a wire communication with the main unit 1. When removed from the main unit 1, the display part 5 carries out a wireless communication with the main unit 1. The wire communication between the display part 5 and the main unit 1 is carried out through a pair of joining terminals 3*c*, 3*d*. The joining terminal 3*d* is arranged on a back side of the display part 5, and is utilized for a serial communication (wire communication) with the main unit 1. The joining terminal 3*c* is arranged on a portion of the main unit 1 corresponding to the joining terminal 3*d*, and is utilized for the serial communication with the display part 5. In addition, the display part 5 arranges a transceiver (not shown). The transceiver plays the wireless communication during the time when the display part 5 is removed from the main unit 1.

The wireless communicating unit 2 arranges a transceiver (not shown) having an IP address, ID or the like, to communicate with another transceiver of the display part 5, in one-to-one correspondence manner. The transceiver of the wireless communicating unit 2 plays the wireless communication with another transceiver of the display part 5, during the time when the display part 5 is removed from the main unit 1.

Figure 15:
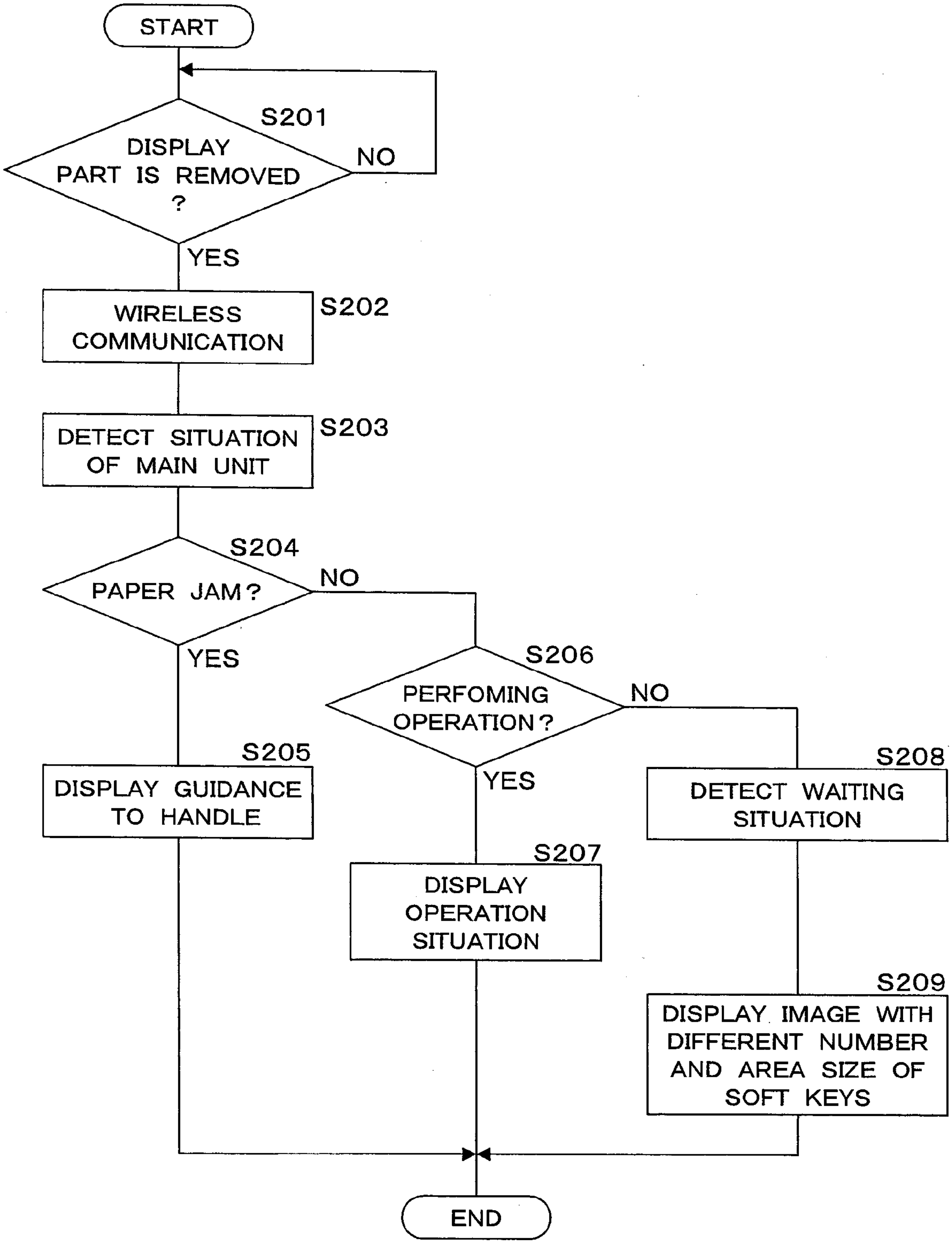
FIG. 15 is a flowchart showing a procedure performed by a CPU of the digital multi-function machine in accordance with the Embodiment 2 of the present invention.

FIG. 15 is a flowchart showing a procedure performed by a CPU 101 of the digital multi-function machine in accordance with the embodiment 2 of the present invention. For illustration purposes, the digital multi-function machine of the embodiment 2 is assumed to have the main unit 1 whose situations belong within three categories: waiting situations; operation situations; and malfunction situations. Hereafter, it will be illustrated with occurrence of the paper jam as an example of the malfunction situations.

When a user selects a "power switch" keypad of the accepting unit 7, the CPU 101 accepts an instruction to power on the digital multi-function machine of the embodiment 2, through the accepting unit 7. The situations of the main unit 1 belong to one of three categories: waiting situations; operation situations; and malfunction situations, when the digital multi-function machine is powered on. In this case, the display part 5 is still attached to the main unit 1. Thus, the display part 5 carries out the wire communication with the main unit 1 through the joining terminals 3*c*, 3*d*.

The CPU 101 determines whether the display part 5 is removed from the main unit 1 or not (S 201). This determination is carried out by detecting voltage changes between the joining terminals 3*c*, 3*d*.

When the CPU 101 determines that the display part 5 is attached to the main unit 1 (S 201: NO), the CPU 101 repeats the determination S 201 until the display part 5 is removed from the main unit 1. On the other hand, when the CPU 101 determines that the display part 5 is removed from the main unit 1 (S 201: YES), the wireless communication is carried out (S 202). In other words, the CPU 101 controls the switching unit 62 to activate the wireless communicating unit 2 for the wireless communication. Thus, the wireless communication is carried out through the transceiver of the wireless communication unit 2 and another transceiver of the display part 5.

The CPU 101 then detects the situation of the main unit at the time when the display part 5 is removed from the main unit 1 (S 203). In other words, the CPU 101 determines whether the main unit 1 is performing an operation, such as copying, printing, sending data, or the like, is performing no operation (or waiting for instructions of users), or is malfunctioning because of paper empty, paper jam, or the like.

The CPU 101 determines whether the main unit 1 is in the situations of paper jam or not, in accordance with the determination at S 203 (S 204). When the CPU 101 determines that the main unit 1 is in the situations of paper jam (S 204: YES), the CPU 101 controls the display part 5 to show a guidance image representing an occurred site of the paper jam, details on how to solve the paper jam, and the like (S 205).

When the CPU 101 determines that the main unit 1 is not in the situations of paper jam (S 204: NO), the CPU 101 further determines whether the main unit 1 is in the operation situations or not (S 206). When the CPU 101 determines that the main unit 1 is in the operation situations (S 206: YES), the CPU 101 controls the display part 5 to show images for an operation performed now, such as number of documents taken into already, number of the taken documents whose print operations are accomplished already, accomplishment of data send operation, or the like (S 207).

When the CPU 101 determines that the main unit 1 is not in the operation situations (S 206: NO), the CPU 101 further determines that the main unit 1 is in the waiting situations (S 208). The CPU 101 controls the display part 5 to show images with different number and area size of soft keys 5B on a touchscreen 5A (for example, enlarging area size, reducing numbers), with respect to images before removing the display part 5 from the main unit 1 (S 209). In other words, when the main unit 1 attaching the display part 5 is in the waiting situations, not in the operation situations, such as copying, printing, sending data, or the like, the display part 5 firstly shows a text representing that the present situation of the main unit 1 is the waiting situations and a text representing that the main unit 1 can accept users' instructions. Then, when the display part 5 is removed from the main unit 1, the display part 5 shows images with enlarged or reduced area size of soft keys 5B, with respect to images shown on the display part 5 before removing the accepting unit 7.

Figure 16:
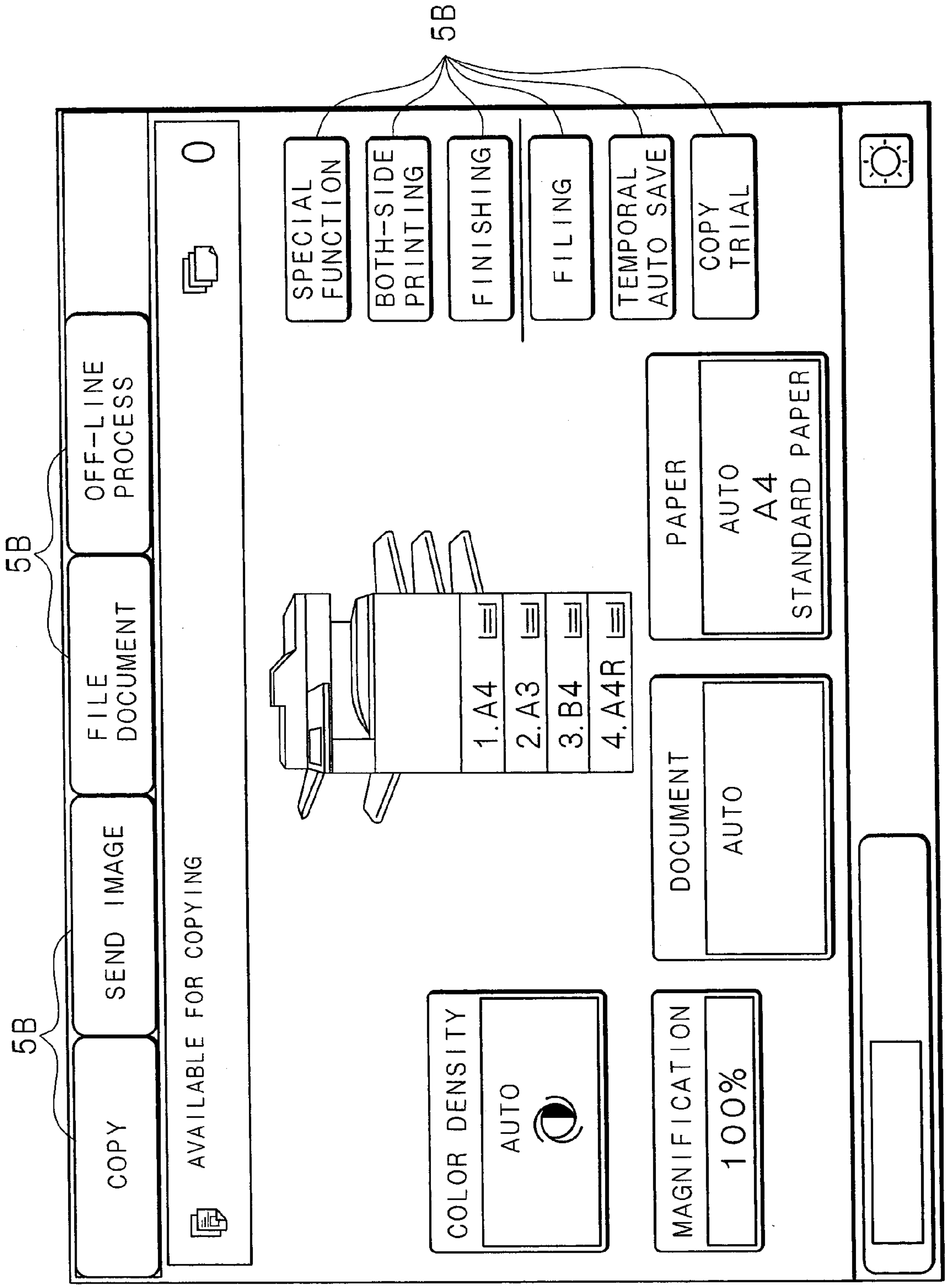
FIG. 16 is an example of display image on a display part before a display part is removed from a main unit, during the time when the main unit is waiting for an instruction to perform an operation.
Figure 17:
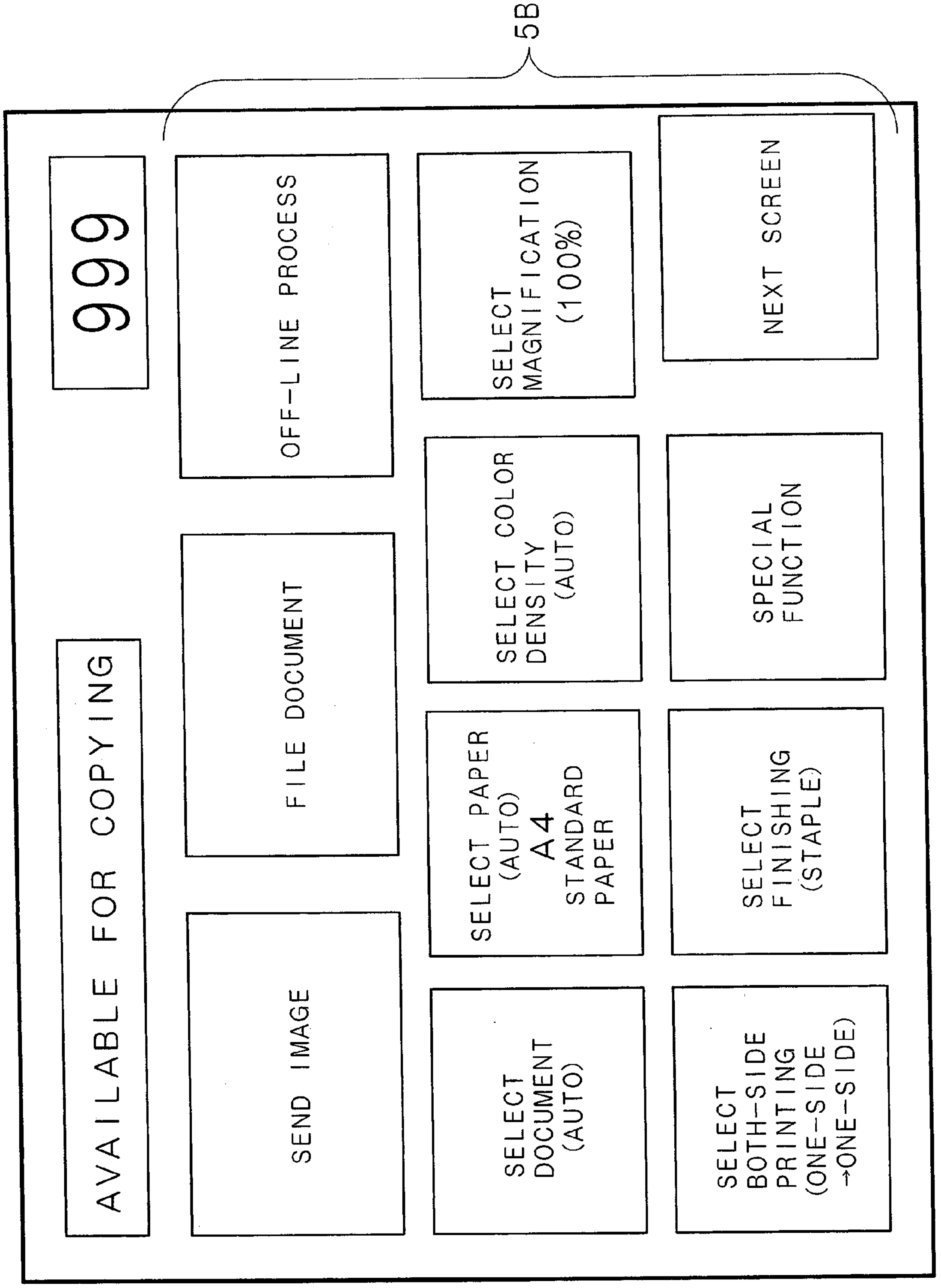
FIG. 17 is an example of display image on a display part after the display part is removed from the main unit, during the time when the main unit is waiting for the instruction to perform the operation.

Hereinafter, it will be illustrated about the change of the images on the display part 5 during the waiting situations, with referring to FIG. 16 and FIG. 17, before and after removing the display part 5 from the main unit 1. FIG. 16 is an example of display image on the display part 5 before the display part 5 is removed from the main unit 1. FIG. 17 is an example of display image on the display part 5 after the display part 5 is removed from the main unit 1. Before removing the display part 5 from the main unit 1, the display part 5 shows a text "available for copying" and information for users showing the waiting situations, information showing no performing operations, and information showing availability to accept instruction of users. On the other hand, after removing the display part 5 from the main unit 1, the display part 5 shows images with so-called universal design, such as reduced total number of the soft keys 5B and enlarged area size/enlarged character size of particular keys corresponding to basic operation or important function among the soft keys 5B. In S210, the present invention is explained in the context of enlarging area of soft keys 5B displayed on the display part 5. It should be noted that the present invention is not limited to these configurations. For example, the soft keys 5B include basic/important soft keys that are selected often by users and unimportant keys that are rarely selected by users. Thus, after removing the display part 5 from the main unit 1, the display part 5 may show images with enlarged area size of the basic/important soft keys and reduced area size of the unimportant soft keys, in accordance with the object according to the present invention.

Some configurations and advantages of the embodiment 2 are described above. Other configurations that are the same as those of the embodiment 1 are given the identical numerals to the embodiment 1 and, accordingly, those other configurations and other advantages will not described in detail.

In the embodiment 1, it is illustrated that the accepting unit 7 carries out the wire communication with the main until when attached to the main unit 1, and that the accepting unit 7 carries out the wireless communication with the main unit 1 when removed from the main unit 1. In the embodiment 2, it is illustrated that the display part 5 carries out the wire communication with the main until when attached to the main unit 1, and that the display part 5 carries out the wireless communication with the main unit 1 when removed from the main unit 1. It should be noted that the present invention is not limited to these configurations. For example, a digital multi-function machine may arrange an elastic cord having an automatic winding function, which connects the accepting unit 7 or the display part 5 with the main unit 1. Thus, the wire communication can be carried out through the elastic cord, even when the accepting unit 7 or the display part 5 is removed from the main unit 1. Alternatively, a full-time wireless communication is also available for the digital multi-function machine in accordance with the embodiment of the present invention. Removing the accepting unit 7 or the display part 5 is not detected through sensing voltage changes between the joining terminals 3*a*, 3*b* (or 3*c*, 3*d*), if the digital multi-function machine carries out the full-time wire communication or the full-time wireless communication. Thus, the digital multi-function machine may arrange, for these configurations, a switch between the accepting unit 7 or the display part 5 and the main unit 1, the switch being changed on/off in response to the removing of the accepting unit 7 or the display part 5.

As this invention may be embodied in several forms without departing from the spirit of essential characteristics thereof, the present embodiment is therefore illustrative and not restrictive, since the scope of the invention is defined by the appended claims rather than by the description preceding them, and all changes that fall within metes and bounds of the claims, or equivalence of such metes and bounds thereof are therefore intended to be embraced by the claims.

What is claimed is:

1. An electric apparatus comprising:

an accepting unit having a display part and accepting an instruction;

a main unit that performs an operation in accordance with the instruction, wherein the accepting unit is removable from the main unit;

a remove detecting unit that detects whether the accepting unit is removed from the main unit or not;

a situation detecting unit that detects a situation of the main unit when the accepting unit is removed from the main unit; and a display controlling unit that controls the display part to display information in accordance with a detected result by the situation detecting unit, wherein when the situation detecting unit detects that the main unit malfunctions, the display controlling unit controls the display part to display:

when the accepting unit is attached to the main unit, information representing the occurrence of the malfunction, and when the accepting unit is removed from the main unit, information for solving the situation that the main unit malfunctions.

2. An electric apparatus according to claim 1, wherein the accepting unit communicates with the main unit, during the time when the accepting unit is attached to the main unit; and the accepting unit communicates with the main unit, during the time even when the accepting unit is removed from the main unit.

3. An electric apparatus according to claim 1, wherein the accepting unit carries out a wire communication with the main unit, during the time when the accepting unit is attached to the main unit; and the accepting unit carries out a wireless communication with the main unit, during the time when the accepting unit is removed from the main unit.

4. An electric apparatus according to claim 1, wherein the accepting unit comprises a touchscreen having one or more keys to accept the instruction.

5. An electric apparatus comprising:

an accepting unit having a display part and accepting an instruction;

a main unit that performs an operation in accordance with the instruction, wherein the accepting unit is removable from the main unit;

a remove detecting unit that detects whether the accepting unit is removed from the main unit or not;

a situation detecting unit that detects a situation of the main unit when the accepting unit is removed from the main unit; and a display controlling unit that controls the display part to display information in accordance with a detected result by the situation detecting unit, wherein when the situation detecting unit detects that the main unit is performing the operation in accordance with the instruction, the display controlling unit controls the display part to display:

when the accepting unit is attached to the main unit, information showing what operation the main unit is performing, and when the accepting unit is removed from the main unit, information for representing a progress of accomplishment of the operation in accordance with the instruction.

6. An electric apparatus according to claim 5, wherein the accepting unit carries out a wire communication with the main unit, during the time when the accepting unit is attached to the main unit; and the accepting unit carries out a wireless communication with the main unit, during the time when the accepting unit is removed from the main unit.

7. An electric apparatus according to claim 5, wherein the accepting unit comprises a touchscreen having one or more keys to accept the instruction.

8. An electric apparatus according to claim 5, wherein when the situation detecting unit detects that the main unit malfunctions, the display controlling unit controls the display part to display when the accepting unit is attached to the main unit, information representing the occurrence of the malfunction, and when the accepting unit is removed from the main unit, information for solving the situation that the main unit malfunctions.

9. An electric apparatus according to claim 1, wherein when the situation detecting unit detects that the main unit is performing the operation in accordance with the instruction, the display controlling unit controls the display part to display when the accepting unit is attached to the main unit, information showing what operation the main unit is performing, and when the accepting unit is removed from the main unit, information for representing a progress of accomplishment of the operation in accordance with the instruction.

10. An electric apparatus according to claim 5, wherein when the situation detecting unit detects that the main unit is waiting for an instruction and held in reserve ready for performing an operation, the display controlling unit increases a character size displayed on the display part from a first character size when the accepting unit is attached to the main unit to a second character size, larger than the first character size, when the accepting unit is removed from the main unit.

11. An electric apparatus according to claim 1, wherein when the situation detecting unit detects that the main unit is waiting for an instruction and held in reserve ready for performing an operation, the display controlling unit increases a character size displayed on the display part from a first character size when the accepting unit is attached to the main unit to a second character size, larger than the first character size, when the accepting unit is removed from the main unit.

12. An electric apparatus according to claim 5, wherein the accepting unit communicates with the main unit, during the time when the accepting unit is attached to the main unit; and the accepting unit communicates with the main unit, during the time even when the accepting unit is removed from the main unit.

* * * * *